US012046845B2

(12) United States Patent
Kobayashi et al.

(10) Patent No.: US 12,046,845 B2
(45) Date of Patent: Jul. 23, 2024

(54) ELECTRICAL WIRE CONNECTOR AND WIRE-TO-BOARD CONNECTOR

(71) Applicant: Molex, LLC, Lisle, IL (US)

(72) Inventors: Hiroki Kobayashi, Yamato (JP); Ayako Matsumoto, Yamato (JP); Kensuke Yamada, Yamato (JP)

(73) Assignee: Molex, LLC, Lisle, IL (US)

( * ) Notice: Subject to any disclaimer, the term of this patent is extended or adjusted under 35 U.S.C. 154(b) by 165 days.

(21) Appl. No.: 17/739,164

(22) Filed: May 9, 2022

(65) Prior Publication Data

US 2022/0376420 A1 Nov. 24, 2022

(30) Foreign Application Priority Data

May 21, 2021 (JP) ................................ 2021-086008

(51) Int. Cl.
*H01R 13/11* (2006.01)
*H01R 12/75* (2011.01)
*H01R 13/115* (2006.01)

(52) U.S. Cl.
CPC ........... *H01R 13/115* (2013.01); *H01R 12/75* (2013.01)

(58) Field of Classification Search
CPC ...... H01R 13/115; H01R 13/11; H01R 13/10; H01R 13/02; H01R 12/75
See application file for complete search history.

(56) References Cited

U.S. PATENT DOCUMENTS 3,634,811 A * 1/1972 Teagno .................. H01R 13/28 439/595
4,291,935 A * 9/1981 Badoz .................... H01R 4/245 439/399
4,784,623 A * 11/1988 Beck, Jr. ................ H01R 12/68 439/422
4,840,578 A * 6/1989 Sato ....................... H01R 4/185 439/402

(Continued)

FOREIGN PATENT DOCUMENTS

CN 202749598 U 2/2013
CN 105098539 A 11/2015

(Continued)

*Primary Examiner* — Harshad C Patel

(57) ABSTRACT

A terminal connected to the end of an electrical wire, including:
- a main body portion connected to a core wire of the electrical wire and a contacting portion connected to the front end of the main body portion having a portion with a U-shaped cross-section that connects to a mating terminal, wherein the contacting portion includes:
- an upper plate portion connected to the main body portion,
- a lower plate portion that is parallel with the upper plate portion,
- a side plate portion that connects one of either the left or right edges of the upper plate portion and the lower plate portion,
- a tip mating recessed portion demarcated on three sides by the upper plate portion, the lower plate portion, and the side plate portion,
- an inclined protruding piece that extends diagonally downward from the back end of the lower plate portion, and (Continued)

a middle plate portion that extends between the inclined protruding piece and the upper plate portion in the width direction of the contacting portion.

8 Claims, 13 Drawing Sheets

(56) References Cited

U.S. PATENT DOCUMENTS

| | | | | | |
|---|---|---|---|---|---|
| 4,863,400 | A * | 9/1989 | Sato | H01R 13/422 | 439/400 |
| 4,889,501 | A * | 12/1989 | Sato | H01R 13/422 | 439/395 |
| 5,611,717 | A * | 3/1997 | Joly | H01R 13/14 | 439/857 |
| 5,616,041 | A * | 4/1997 | Brown | H01R 24/76 | 439/222 |
| 5,911,603 | A * | 6/1999 | Mansutti | H01R 13/111 | 439/748 |
| 6,183,309 | B1 * | 2/2001 | Chiang | H01R 4/185 | 439/850 |
| 6,464,547 | B2 * | 10/2002 | Ketelsleger | H01R 13/11 | 439/748 |
| 6,672,910 | B2 * | 1/2004 | Hotea | H01R 13/5208 | 439/843 |
| D494,545 | S * | 8/2004 | Kuroda | D13/154 | |
| 7,033,194 | B1 * | 4/2006 | Le Beau | H01R 13/28 | 439/291 |
| 7,717,759 | B2 * | 5/2010 | Ishigami | H01R 13/114 | 439/852 |
| D668,621 | S * | 10/2012 | Gieski | D13/154 | |
| 8,764,482 | B2 | 7/2014 | Matsumura et al. | | |
| 9,515,406 | B2 * | 12/2016 | Yu | H01R 13/41 | |
| 10,122,108 | B2 * | 11/2018 | Bhagyanathan Sathianathan | H01R 13/187 | |
| 10,270,197 | B2 * | 4/2019 | Kitamura | H01R 13/11 | |
| 2018/0277990 | A1 * | 9/2018 | Ho | H01R 12/58 | |
| 2020/0313336 | A1 | 10/2020 | Miyakawa et al. | | |

FOREIGN PATENT DOCUMENTS

| | | | |
|---|---|---|---|
| JP | 4215414 | B2 | 1/2009 |
| JP | 6130236 | B2 | 5/2017 |
| JP | 2017204411 | A | 11/2017 |
| JP | 2019185875 | A | 10/2019 |
| KR | 20030097685 | A | 12/2003 |

* cited by examiner

ELECTRICAL WIRE CONNECTOR AND WIRE-TO-BOARD CONNECTOR

RELATED APPLICATIONS

The present application claims priority to Japanese Patent Application No. 2021-086008 filed on May 21, 2021 which is incorporated by reference in its entirety.

TECHNICAL FIELD

The present disclosure relates to terminals, electrical wire connectors and wire-to-board connectors.

BACKGROUND ART

Conventionally, a wire-to-board connector has been used to connect an electrical wire such as a cable to a board such as a printed circuit board (see, for example, Patent Document 1). In this manner of wire-to-board connector, the electrical wire connector connected to the end of the electrical wire mates with a board connector mounted on the surface of the board.

FIG. 13 is a cross-sectional view illustrating a conventional electrical wire connector and a board connector in a meshed state.

In the diagram, reference numeral 801 is an electrical wire connector, which is mated with a board connector 901 mounted on the surface of a board (not shown).

The electrical wire connector 801 has an electrical wire housing 811 and a plurality of electrical wire terminals 861 attached to the electrical wire housing 811.

Furthermore, the electrical wire housing 811 includes a main body portion 812, a mating protruding portion 814 protruding from the main body portion 812 in the fitting direction (right direction in the diagram), and a plurality of terminal insertion holes 813. The terminal insertion hole 813 is a cavity formed so as to pass through the main body portion 812 and the mating protruding portion 814 and extend in the mating direction, and each electrical wire terminal 861 is inserted into and stowed in each of the cavities. A plurality of lances 815 are formed on the lower surface of the electrical wire housing 811 to engage the electrical wire terminals 861 stowed in the terminal insertion holes 813 so that the electrical wire terminals 861 cannot be pulled out.

In addition, the electrical wire terminals 861 are members composed of a metal plate respectively connected to the end of a corresponding electrical wire 891 and a substantially box-shaped contacting portion 864 is formed at the tip in the mating direction. The contacting portion 864 includes an upper surface portion 864*a* positioned on the upper side and a lower surface portion 864*b* positioned on the lower side, and an engaging piece 869 that engages with the tip of the lance 815 and is formed on the rear end of the lower surface portion 864*b*.

On the other hand, the board connector 901 includes a board housing 911 and a plurality of board terminals 961 attached to the board housing 911.

The board housing 911 includes an insertion space 913 open on the mating surface (left surface in diagram). The insertion space 913 is a cavity formed extending in the mating direction and the plurality of board terminals 961 are mounted therein.

In addition, the board terminals 961 are respectively members formed from punching a metal plate and include a tail portion 962, a support portion 963, and a contact arm portion 964. The lower end of the tail portion 962 is connected to a connecting pad formed on the surface of a substrate (not shown) by soldering. In addition, the support portion 963 is secured to the board housing 911 and extends along the lower surface of the insertion space 913. Furthermore, the contact arm portion 964 is a member that extends close to the upper surface of the insertion space 913 and can be elastically displaced in the vertical direction.

As illustrated in the diagram, when the electrical wire connector 801 is mated to the board connector 901, the portion near the tip of the mating protruding portion 814 of the electrical wire housing 811 is inserted into the insertion space 913 of the board housing 911 and is locked by a locking mechanism that is not shown. As a result, the mated state of the electrical wire connector 801 and the board connector 901 is reliably maintained. In addition, the contacting portion 864 of the electrical wire terminal 861 enters between the support portion 963 of the corresponding board terminal 961 and the contacting arm portion 964, and the upper surface portion 864*a* and the lower surface portion 864*b* of the contacting portion 864 come into contact and conduct with the contact arm portion 964 and the support portion 963. Therefore, the electrical wire 891 is connected to the board on which the board connector 901 is mounted. Furthermore, since the engaging piece 869 of the electrical wire terminal 861 is engaged to the tip of the lance 815, even if a pull-out force acts on the electrical wire 891, pulling out of the electrical wire terminal 861 from the terminal insertion hole 813 of the electrical wire housing 811 can reliably be prevented.

Prior Art Documents: Patent Document 1: Japanese Unexamined Patent Application 2019-185875

SUMMARY

However, with the conventional wire-to-board connector, when the electrical wire 891 is pulled with a strong force while the electrical wire connector 801 and the board connector 901 are mated, a large force acts on the lance 815, causing the lance 815 to deform. Therefore, there are cases where the engagement of the tip thereof and the engaging piece 869 of the electrical wire terminal 861 disengages and said tip enters into the space between the upper surface portion 864*a* and lower surface portion 864*b* of the electrical wire terminal 861 contacting portion 864. If the electrical wire 891 is pulled with a strong force while the tip of the lance 815 has entered the space of the contacting portion 864 of the electrical wire terminal 861, the lance 815 may be damaged, the contacting portion 864 of the electrical wire terminal 861 may be damaged, or the lance 815 and the electrical wire terminal 861 may be coupled while the tip of the lance 815 remains in a state of having entered the space of the electrical wire terminal 861 contacting portion 864.

Considerations for preventing this manner of situation from occurring include increasing the size of the lance 815 making deformation unlikely, increasing the size of the electrical wire terminal 861 engaging piece 869 making disengagement from the tip of the lance 815 unlikely, or increasing the thickness of the electrical wire terminal 861 contacting portion 864 making damage thereof unlikely. However, in recent years, since the electrical wire connector 801 has been miniaturized in conjunction with the miniaturization of electronic parts, electronic devices, and the like, each part of the lance 815 and the electrical wire terminal 861 has to be very small. Thus, preventing deformation of various parts of the lance 815 and the electrical wire terminal 861 that occurs when the electrical wire 891 is pulled with a strong force and preventing disengagement of the lance 815 and electrical wire terminal 861 are very difficult.

Here, an object of solving the problem of the conventional wire-to-board connector and using an appropriate shape and structure of the terminal and housing, is to prevent disengagement of the terminal and housing even with miniaturization of the terminal and the housing, reliably prevent damage to the terminal and housing, reliably secure the terminal in the housing, enable a lower profile and size reduction, enable simplified configuration, reduced part count, and simplified manufacturing, reduce costs, and thus provide a terminal, an electrical wire connector, and a wire-to-board connector with high reliability.

To achieve this a terminal:

is integrally formed from a conductive metal plate and connected to the end of an electrical wire, and includes:

a main body portion connected to a core wire of the electrical wire and a contacting portion connected to the front end of the main body portion having a portion with a U-shaped cross-section that connects to a mating terminal, wherein the contacting portion includes:

an upper plate portion connected to the main body portion, a lower plate portion that is parallel with the upper plate portion, a side plate portion that connects one of either the left or right edges of the upper plate portion and the lower plate portion, a tip mating recessed portion demarcated on three sides by the upper plate portion, the lower plate portion, and the side plate portion, an inclined protruding piece that extends diagonally downward from the back end of the lower plate portion, and a middle plate portion that extends between the inclined protruding piece and the upper plate portion in the width direction of the contacting portion.

Another terminal where the upper surface of the upper plate portion and the lower surface of the lower plate portion come into contact with a mating contact portion of the mating terminal.

In still another terminal, the width of an inclined protruding piece is the same as the width of the lower plate portion.

In still another terminal, the upper plate portion is connected to the main body portion via a base portion having a U-shaped cross-section connected to the tip of the main body portion, the middle plate portion extends from the lower end of one of the left or right side walls of the base portion towards the side plate portion, and the bottom surface of the middle plate portion comes into contact with or is in contact with the upper surface of the back end of the lower plate portion.

With an electrical wire connector containing a terminal and an insulating material, the terminal being provided with housing for attaching, wherein the housing includes: a main body portion, a mating protruding portion that extends from this main body portion, a terminal stowing hole that extends through the main body portion and mating protruding portion and into which the terminal is inserted, and a housing lance extending from the main body portion, the mating protruding portion including: a recessed entrance portion for stowing the contacting portion tip mating recessed portion of the terminal inserted in the terminal stowing hole, and the housing lance including: a base end portion connected to the main body portion, an inclined arm portion extending diagonally upward from this base end portion, and a contacting portion at the tip of the inclined arm portion that is able to come into contact with the rear end of an inclined protruding piece of the terminal inserted into the terminal stowing hole.

With another electrical wire connector, the width of the contacting portion of the housing lance is substantially the same as the width of the inclined protruding piece of the terminal.

A wire-to-board connector including:

the electrical wire connector, a board connector mounted to the surface of a board including:

a mating housing composed of insulating material and a mating terminal integrally formed from a conductive metal plate that contacts the terminal of the electrical wire connector and is mounted in the mating housing, the wire-to-board connector including the electrical wire connector and the board connector that mates with the electrical wire connector, wherein the mating housing includes:

a mating recessed portion into which the mating protruding portion of the electrical wire connector housing is inserted, the mating terminal includes:

a securing portion for securing the mating housing and a mating contact portion that extends from this securing portion and contacts the contacting portion of the electrical wire connector terminal, and the mating contact portion includes:

a contact upper arm portion that contacts the upper surface of the upper plate portion of the contacting portion, and a contact lower arm portion that contacts the lower surface of the lower plate portion of the contacting portion, and holds the upper plate portion and the lower plate portion.

Even with size reduction of the terminal and housing, the present disclosure enables preventing disengagement of the terminal and housing lance, reliably preventing pulling out of the terminal, reliably preventing damage to the terminal or housing, reliably securing the terminal in the housing, a low profile and size reduction, simplified configuration, reduced part count, simple manufacturing, reduced cost, and improved reliability.

BRIEF DESCRIPTION OF THE DRAWINGS

FIG. 2 is an exploded view of the first connector and the second connector of the present embodiment as viewed from the first connector side. FIG. 3 is an exploded view of the first connector and the second connector of the present embodiment as viewed from the second connector side. FIG. 4 is a perspective view of the first connector of the present embodiment viewed diagonally from below

FIG. 5 is a perspective view of a first housing of the present embodiment viewed diagonally from behind.

FIG. 6 is a perspective view of a first housing of the present embodiment viewed diagonally from below.

FIG. 7 is diagram illustrating a first terminal of the present embodiment.

FIG. 8 is a perspective view of the second connector of the present embodiment viewed diagonally from in front.

FIG. 11 is a perspective view illustrating a side cross-sectional view of the first connector and the second connector in a meshed state according to the present embodiment and is a perspective view illustrating a cross-section along line A-A in FIG. 9.

DETAILED DESCRIPTION OF THE PREFERRED EMBODIMENTS

Embodiments will hereinafter be described in detail with reference to the drawings.

Figure 1:
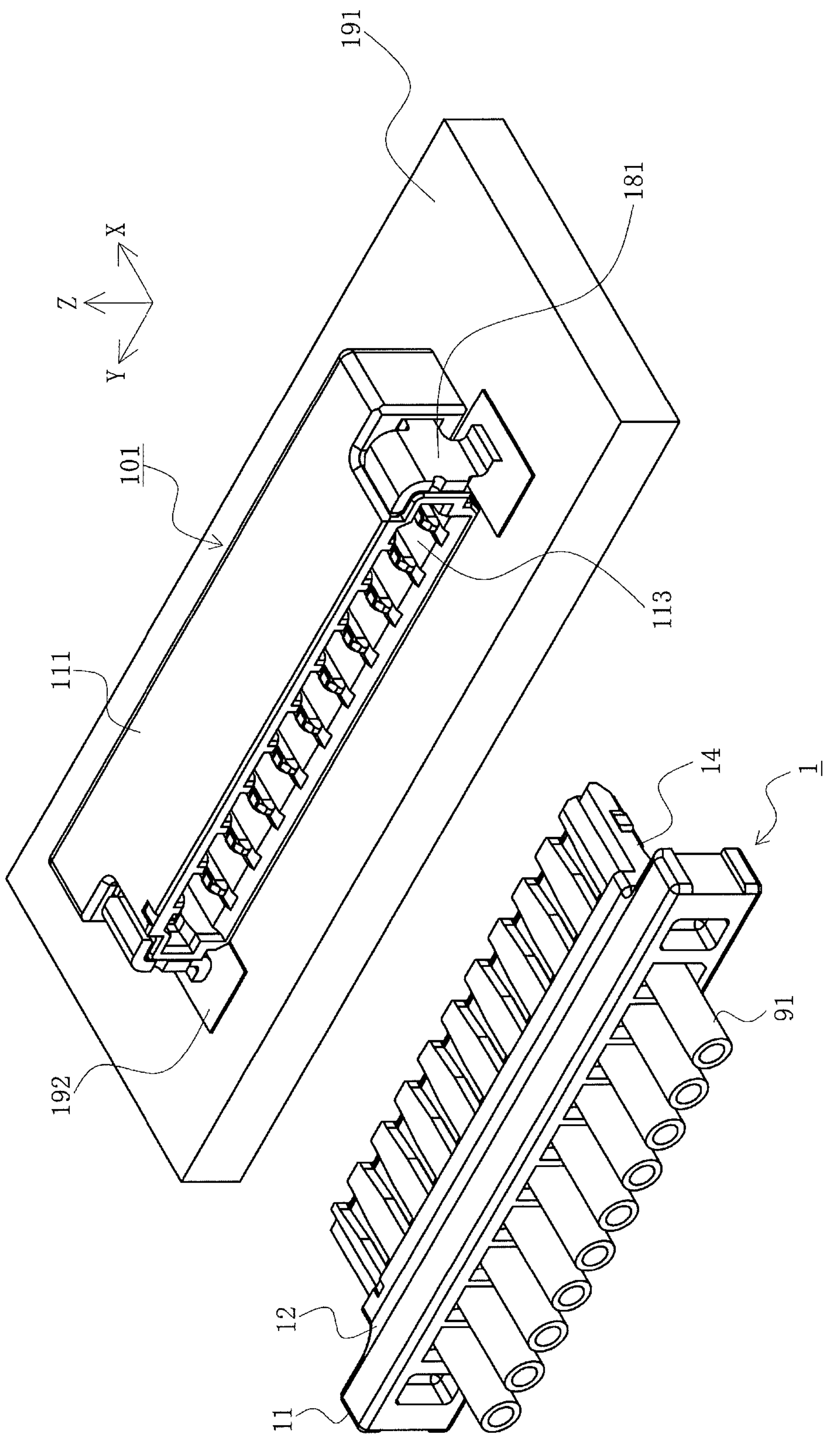
FIG. 1 is a perspective view illustrating a first connector and a second connector of the present embodiment in a state before meshing.
Figure 2A:
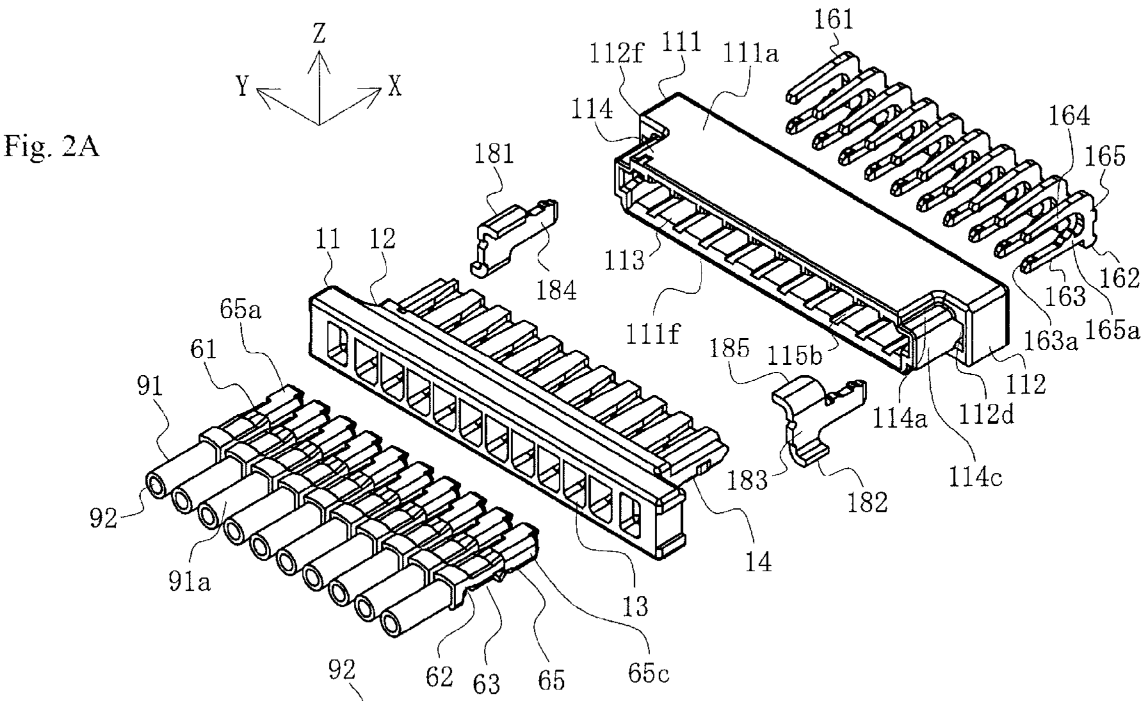
FIG. 2A is a view diagonally from above.
Figure 2B:
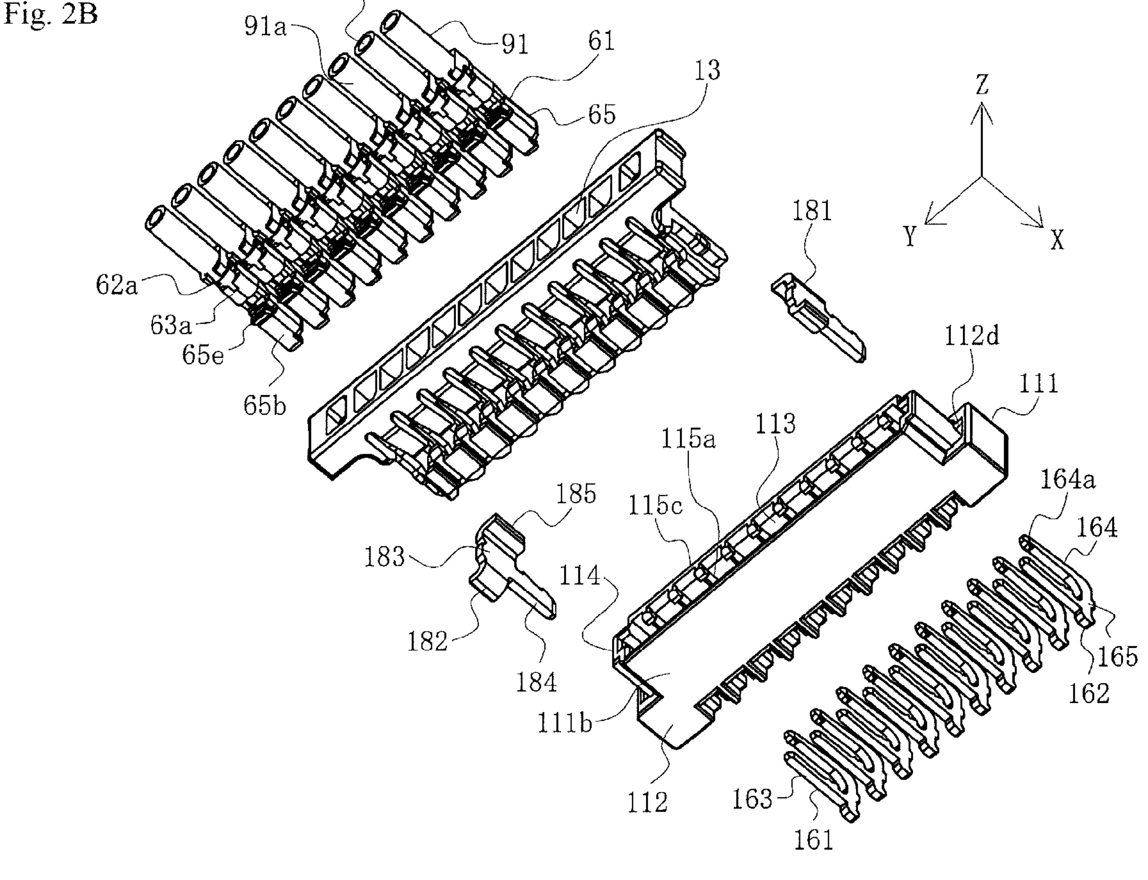
FIG. 2B is a view diagonally from below
Figure 3A:
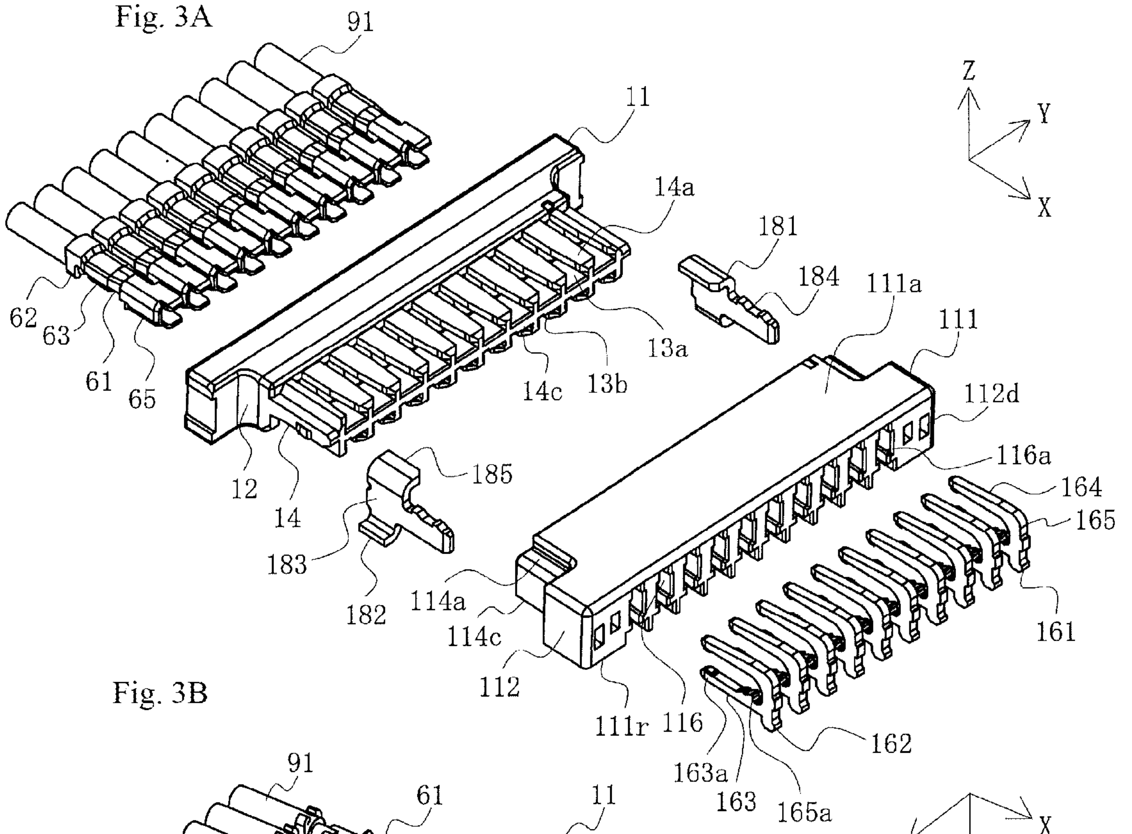
FIG. 3A is a view diagonally from above.
Figure 3B:
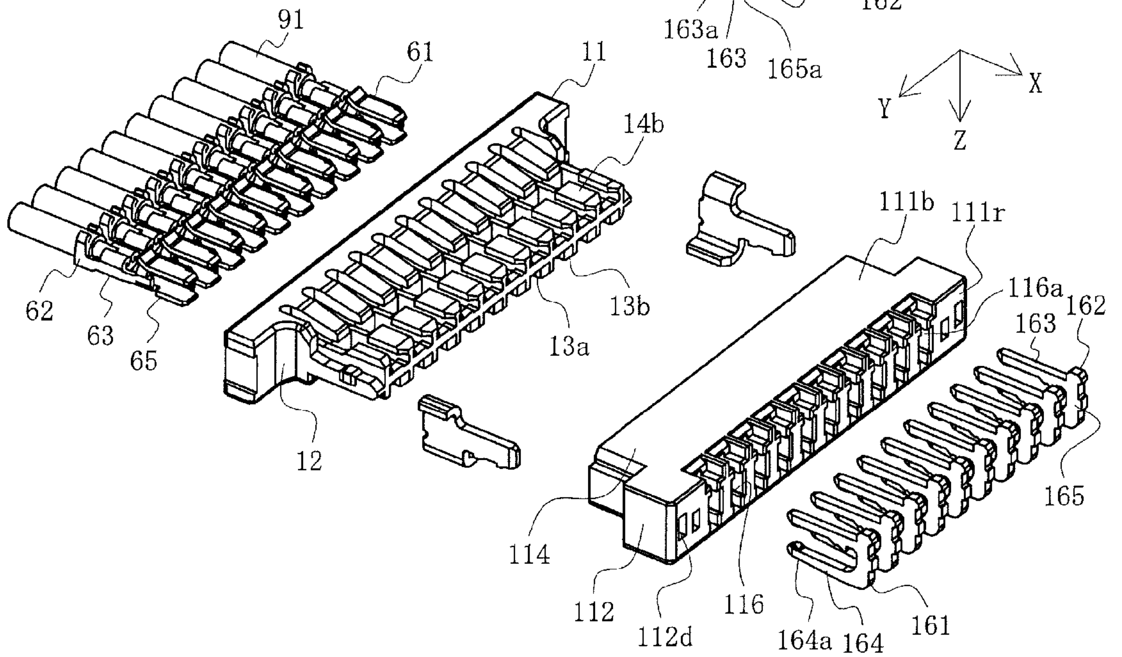
FIG. 3B is a view diagonally from below
Figure 4A:
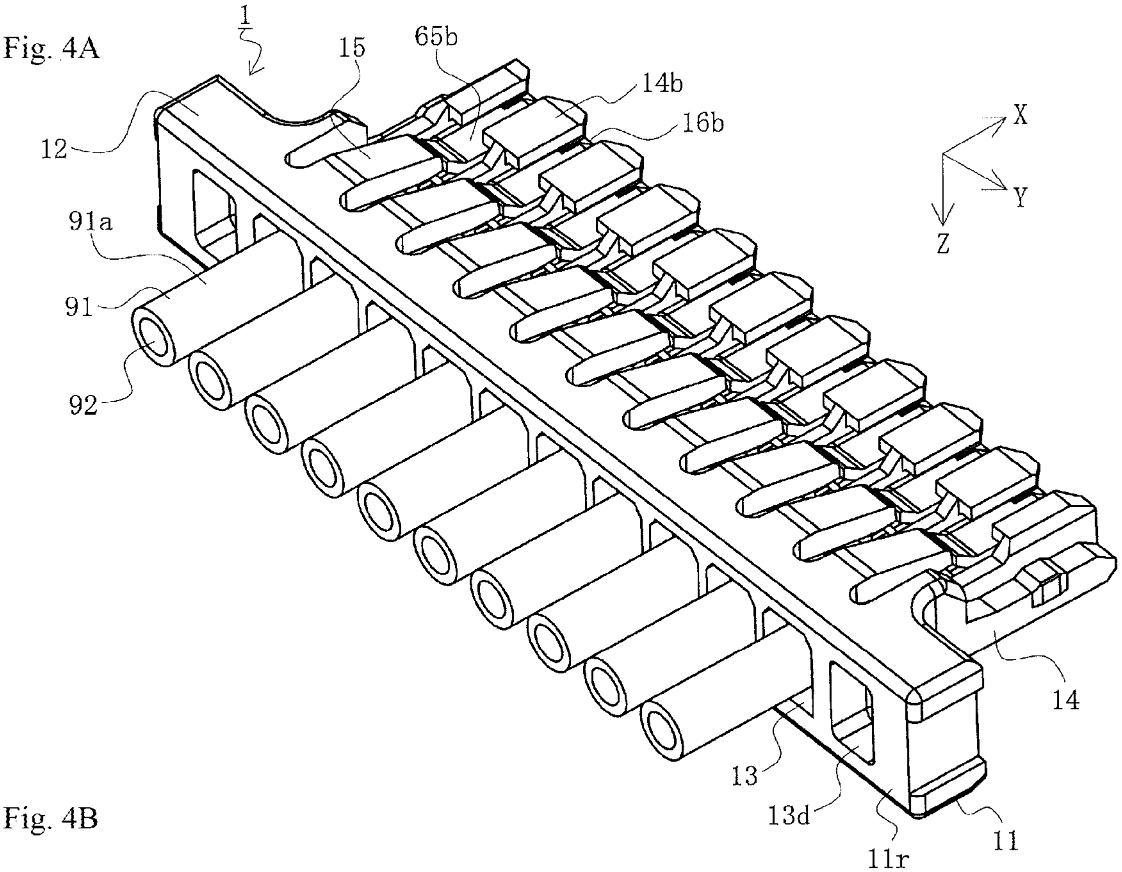
FIG. 4A is a view diagonally from behind.
Figure 4B:
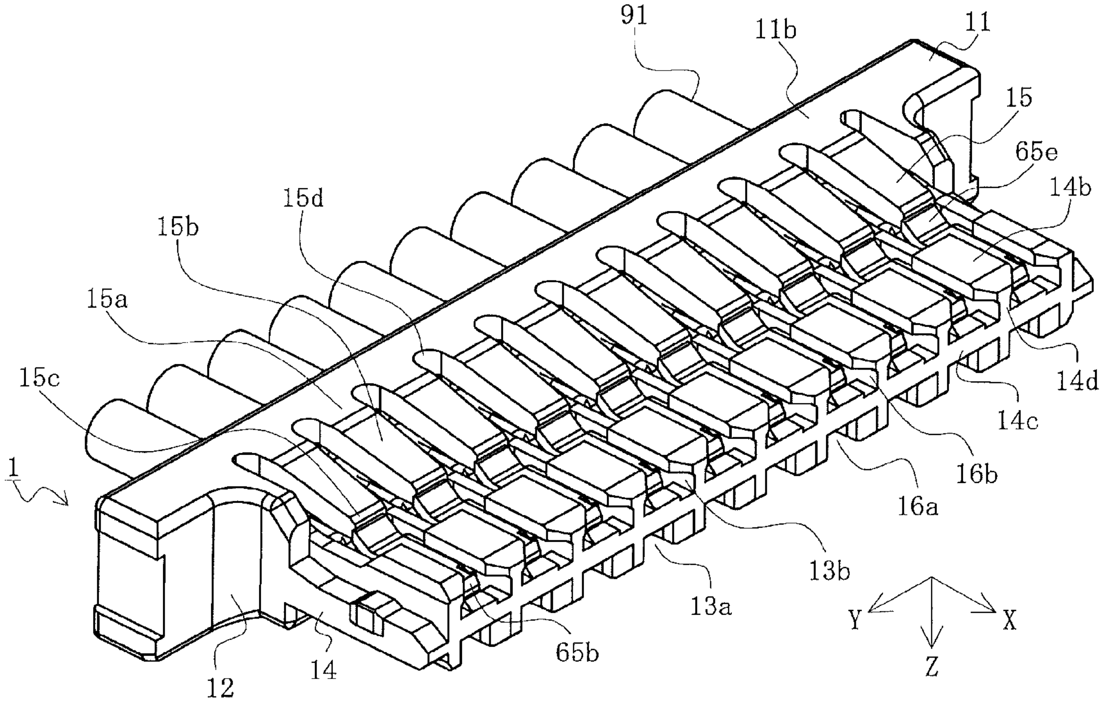
FIG. 4B is a view diagonally from in front.
Figure 5A:
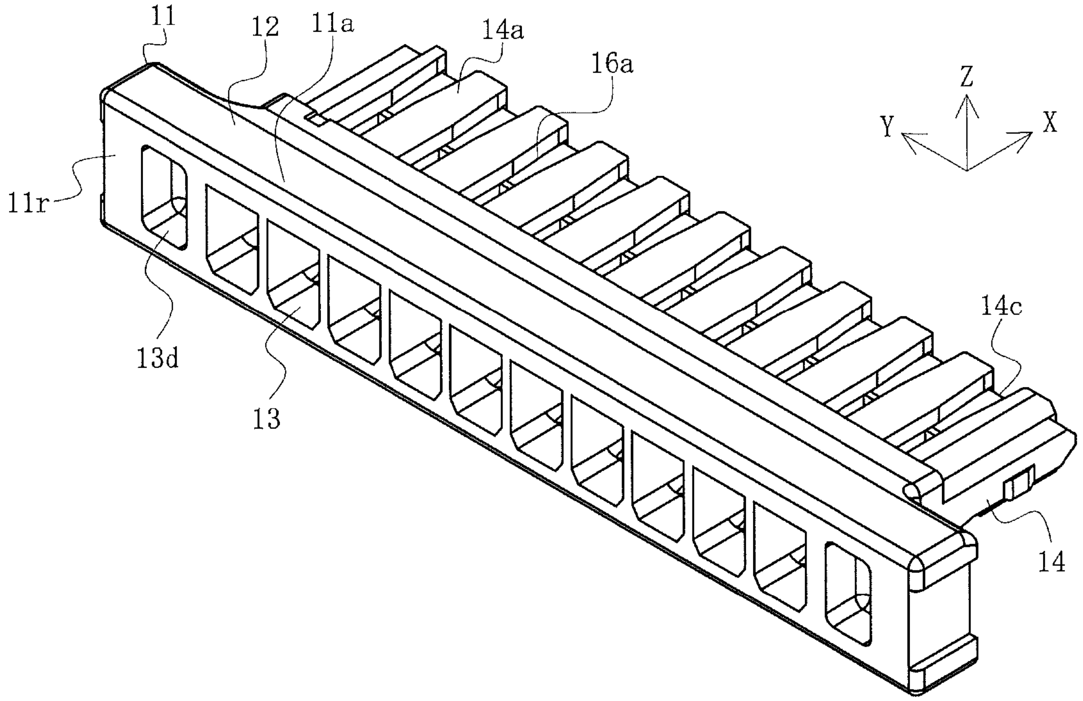
FIG. 5A is a view diagonally from above.
Figure 5B:
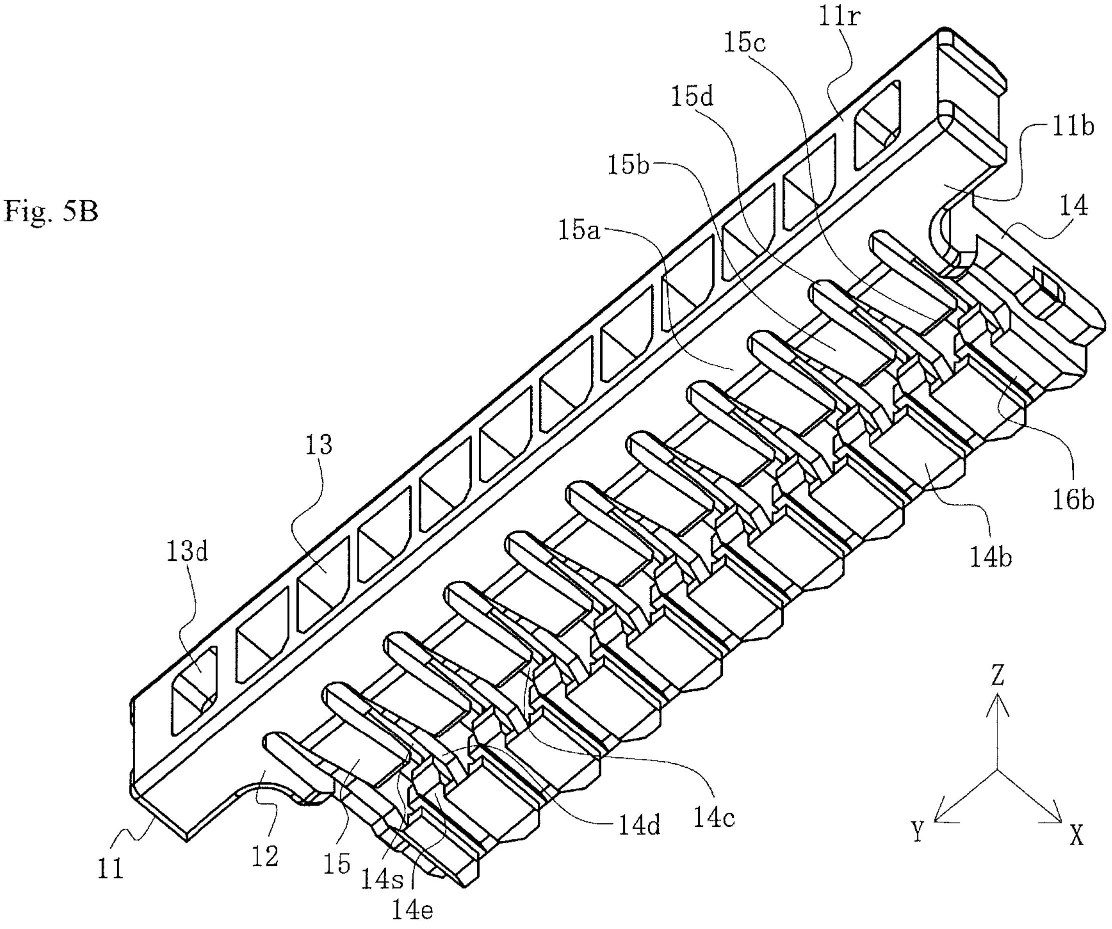
FIG. 5B is a view diagonally from below.
Figure 6A:
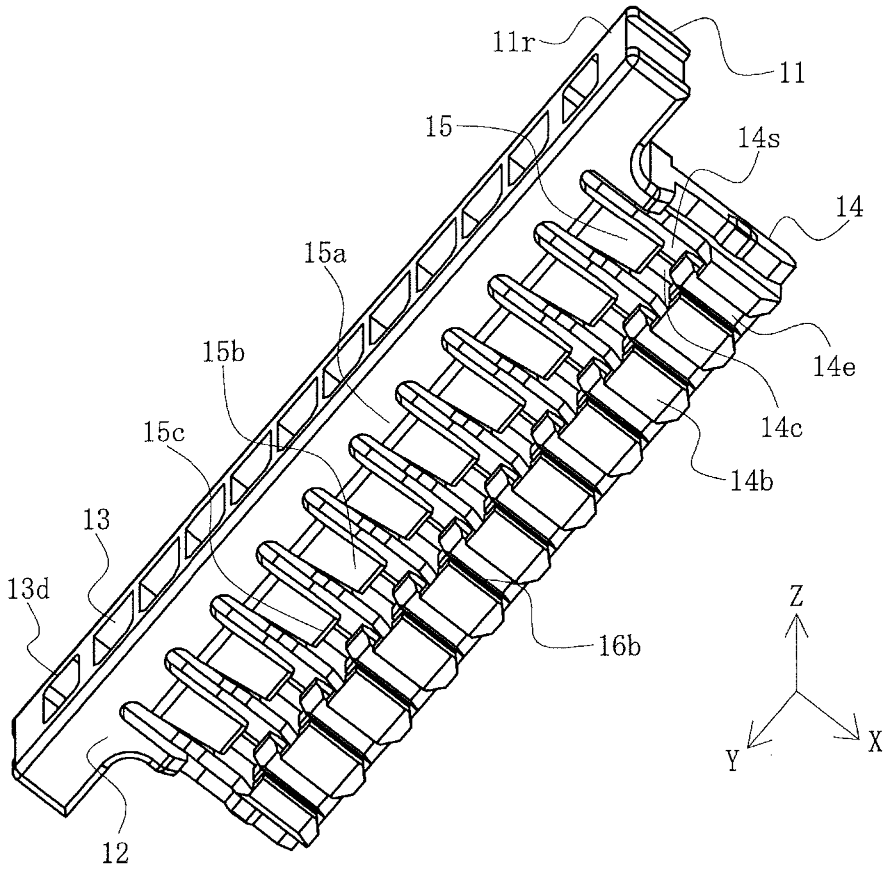
FIG. 6A is a view diagonally from behind.
Figure 6B:
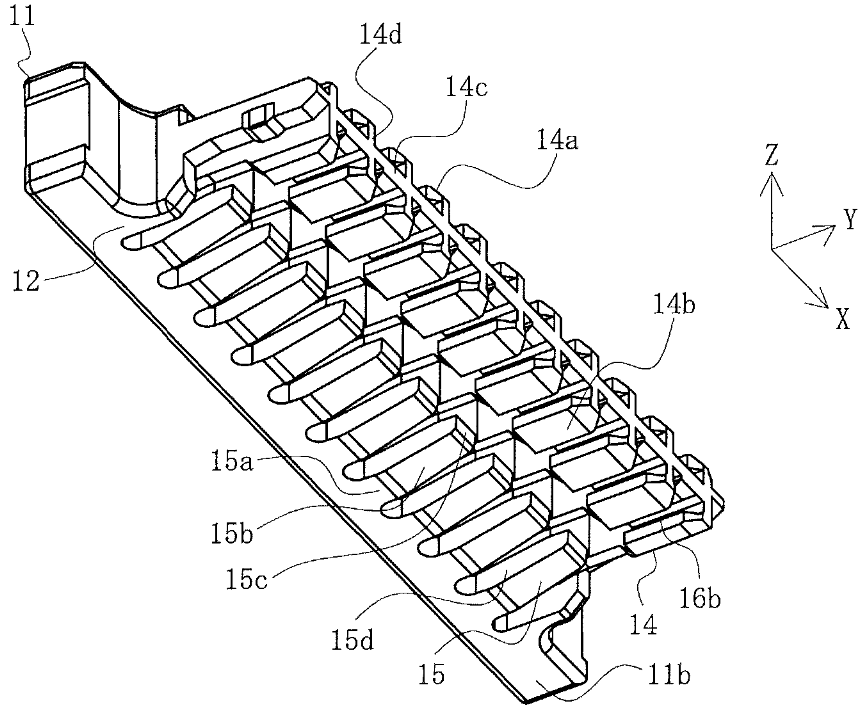
FIG. 6B is a view diagonally from in front.
Figure 7A:
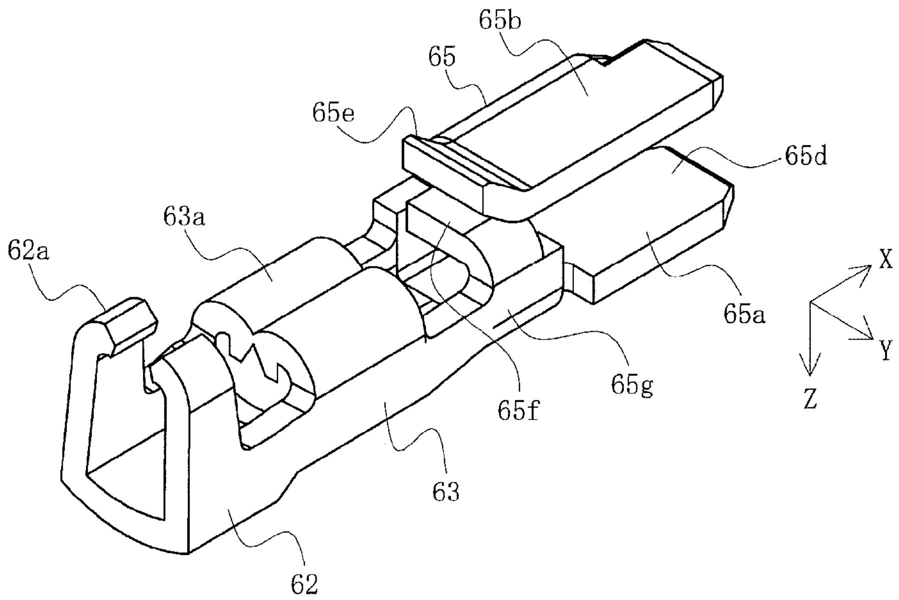
FIG. 7A is a perspective view diagonally from behind.
Figure 7B:
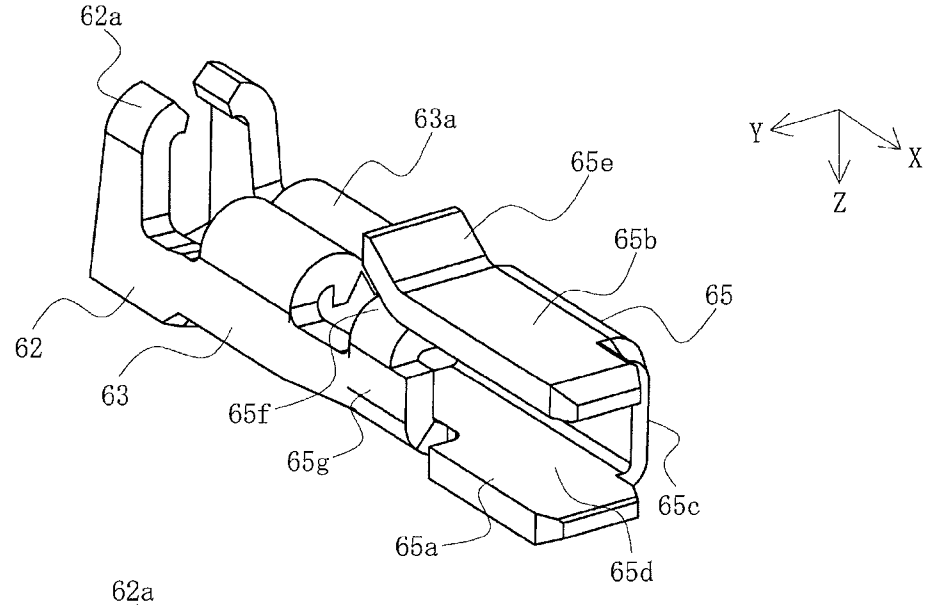
FIG. 7B is a perspective view diagonally from in front.
Figure 7C:
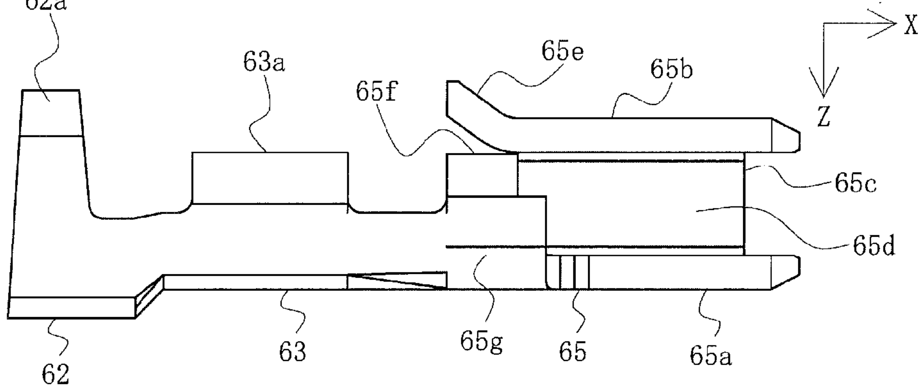
FIG. 7C is a side view.
Figure 8A:
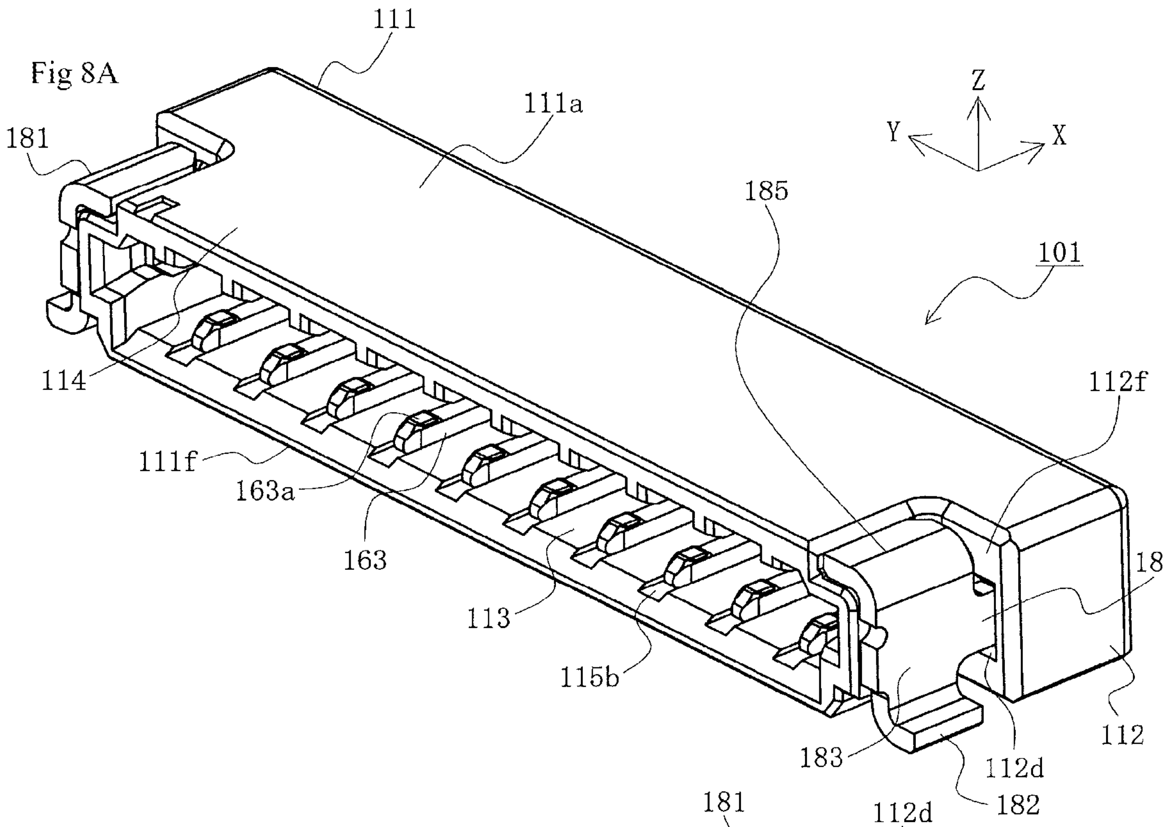
FIG. 8A is a view diagonally from above.
Figure 8B:
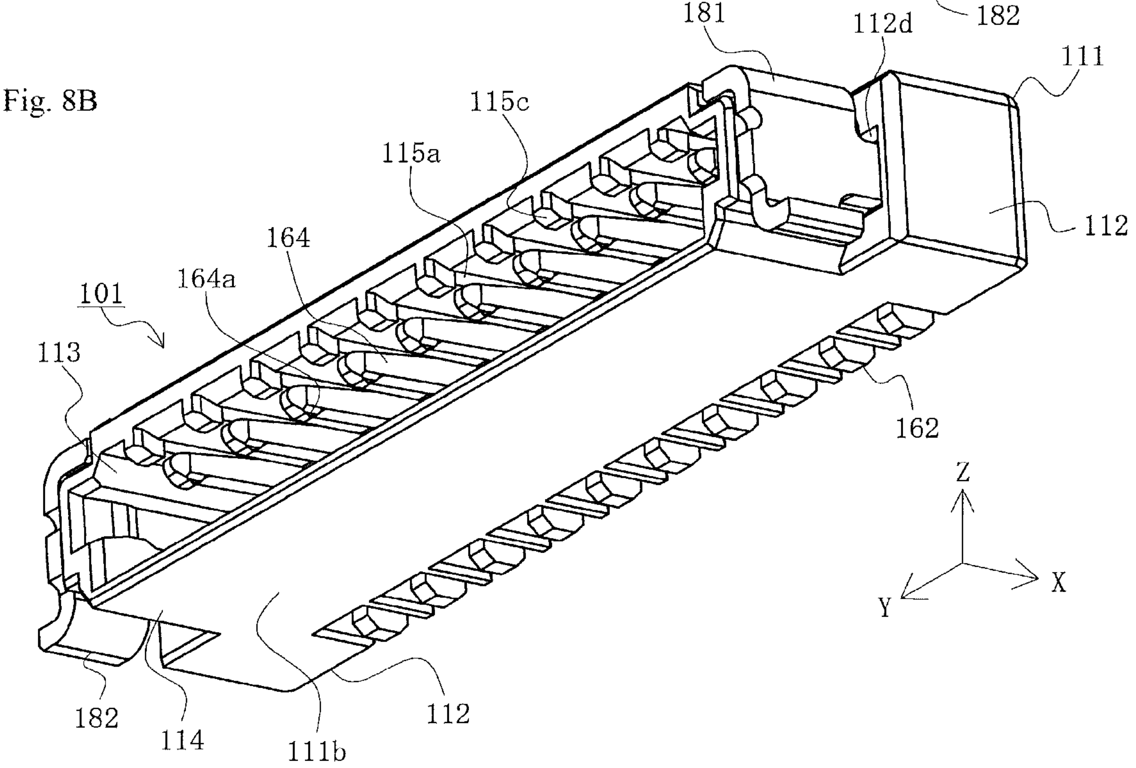
FIG. 8B is a view diagonally from below.

FIG. 1 is a perspective view illustrating the first connector and the second connector of the present embodiment in a state before meshing. FIG. 2 is an exploded view of the first connector and the second connector of the present embodiment as viewed from the first connector side. FIG. 3 is an exploded view of the first connector and the second connector of the present embodiment as viewed from the second connector side. FIG. 4 is a perspective view of the first connector of the present embodiment viewed diagonally from below. FIG. 5 is a perspective view of the first housing of the present embodiment viewed diagonally from behind. FIG. 6 is a perspective view of the first housing of the present embodiment viewed diagonally from below. FIG. 7 is diagram illustrating the first terminal of the present embodiment. FIG. 8 is a perspective view of the second connector of the present embodiment viewed diagonally from in front. Note, in FIG. 2 and FIG. 3, (a) is a view diagonally from above, and (b) is a view diagonally from below. In FIG. 4, (a) is a view diagonally from behind, and (b) is a view diagonally from in front. In FIG. 5, (a) is a view diagonally from above, and (b) is a view diagonally from below. In FIG. 6, (a) is a view diagonally from behind, and (b) is a view diagonally from in front. In FIG. 7, (a) is a perspective view diagonally from behind, (b) is a perspective view diagonally from in front, and (c) is a side view. In FIG. 8, (a) is a view diagonally from above, and (b) is a view diagonally from below.

In the drawings, reference numeral 1 indicates the first connector as an electrical wire connector, one of the wire-to-board connectors in the present embodiment, and is a connector connected to the end of a cable provided with a plurality of electrical wires 91. Furthermore, a first connector 1 is meshed to a second connector 101 as a mating connector which is another wire-to-board connector in the present embodiment. Note, the second connector 101 is a surface mount type board connector mounted on the surface of a board 191.

The wire-to-board connector in the present embodiment includes the first connector 1 and the second connector 101, and electrically connects the electrical wires 91 and the board 191. In the present embodiment, the electrical wires 91 is a signal line. The end of the electrical wires 91 on the side opposite the first connector 1 is connected to an electronic device or the like (not shown). The first connector 1 and second connector 101 will be described as a connector for connecting signal lines to the board 191 but the electrical wires 91 can also include a power supply line and a ground line. The first connector 1 and the second connector 101 can also be used as a connector for connecting a power supply line and a ground line.

In addition, the board 191 is, for example, a printed circuit board used for an electronic device or the like, but may be a silicon substrate, a silicon carbide substrate, or the like in which an electronic element is arranged directly on the surface, and any type of substrate may be used. Furthermore, the electronic device is, for example, a personal computer, a smartphone, a digital television, a vehicle navigation device, a game device, or the like, but may be any kind of electronic device.

In the example shown in the drawings, the second connector 101 is a so-called right angle type board connector. The mating recessed part 113 that the mating protruding portion 14 of the first connector 1 is inserted into when the first connector 1 and second connector 101 are meshed is mounted on the surface of the board 191 with an opening thereof facing a direction parallel to the surface of the board 191; however, the second connector 101 is not limited to a right angle type and may be a straight type connector mounted to the surface of the board 191 with the opening of the mating recessed part 113 facing upward (negative direction of Z axis), or the opening of the mating recessed part 113 may be oriented in a diagonal direction that intersects the surface of the board 191. The opening of the mating recessed part 113 may face any direction. Here, for convenience of explanation, the second connector 101 will be described as a so-called right angle type connector.

Note that expressions for indicating directions such as up, down, left, right, front, and back, used to describe the operations and configurations of the parts of the wire-to-board connector in the present embodiment are not absolute but rather relative directions, and though appropriate when the parts of the wire-to-board connector are in the positions illustrated in the drawings, these directions should be interpreted differently when these positions change, in order to correspond to said change.

The first connector 1 is integrally formed of a resin such as a synthetic resin which is an insulating material, and has a first housing 11 as a housing having an overall shape like a substantially flat rectangular parallelepiped, and first terminals 61 as terminals made of metal mounted in this first housing 11. The number of first terminals 61 matches the number of electrical wires 91 and each is connected to the end of a corresponding electrical wire 91. In the example illustrated in the drawings, the number of electrical wires 91 is ten, but the number of electrical wires 91 can be arbitrarily changed and may be 9 or less, or 11 or more; for example. Furthermore, in the example shown in the drawings, the plurality of electrical wires 91 are arranged in a single row in the width direction (Y-axis direction) of the first connector 1, but the present disclosure is not necessarily limited to this, and for example, the arrangement pattern may be staggered or may be two or more rows.

The first terminal 61 in the present embodiment is a member integrally formed by bending and punching a conductive metal plate and as illustrated in FIG. 7, includes a conducting wire connecting portion 63, a first securing portion 62 as an electrical wire connecting portion connected to the back end of the conducting wire connecting portion 63, and a first contacting tip portion 65 as a contacting portion connected to the front end of the conducting wire connecting portion 63 as a main body portion. The conducting wire connecting portion 63 is a portion that is electrically connected to a core wire 92 as a conducting wire included in the electrical wires 91, and includes a core wire crimping portion 63*a* for crimping the core wire 92. By applying solder as needed, the core wire 92 and the core wire crimping portion 63*a* can be more firmly connected and secured. In addition, the first securing portion 62 includes an electrical wire crimping portion 62*a* for crimping and securing the electrical wire 91 around an insulative coating 91*a* that covers around the core wire 92. By crimping the electrical wire crimping portion 62*a* onto the electrical wires 91, the first terminals 61 are reliably connected to the end of the electrical wires 91.

Furthermore, the first contacting tip portion 65 is a portion that comes into contact with a second terminal 161 as a mating terminal included in the second connector 101. The first contacting tip portion 65 has an elongated square tubular shape with a U-shaped cross section from the tip of the first securing portion 62 (end in positive direction of X axis) toward the front (positive direction of X axis) and includes a flat plate shaped upper plate portion 65*a* connected to the tip of the first securing portion 62 (end in positive direction of X axis) and extending in the front-to-back direction (X axis direction); a flat plate shaped lower plate portion 65*b* extending parallel to the upper plate portion 65*a* in the front-to-back direction; a side plate portion 65*c* connecting one of the left or right edges of the upper plate portion 65*a* and lower plate portion 65*b* (negative direction side of the Y axis in the example illustrated in the drawings), and similarly to the upper plate portion 65*a* and the lower plate portion 65*d*, extends in the front-to-back direction; and a tip mating recessed portion 65*d* demarcated on three sides by the upper plate portion 65*a*, the lower plate portion 65*d*, and the side plate portion 65*c*.

In further detail, the first contacting tip portion 65 includes a trough portion 65*g* with a U-shaped cross-section as a base part connected to the tip of the first securing portion 62. The upper plate portion 65*a* is connected to the tip of the bottom wall of the trough portion 65*g* and so is connected to the first securing portion 62 via the trough portion 65*g*.

Furthermore, the first contacting tip portion 65 includes a terminal lance portion 65*e* as an inclined protruding piece extending from the back end of the lower plate portion 65*b* (end in negative direction of X axis) diagonally downward and a middle plate portion 65*f* extending between the terminal lance 65*e* and the upper plate portion 65*a* in the width direction (Y axis direction) of the first contacting tip portion 65. The middle plate portion 65*f* is a member that is bent approximately 90 degrees and connected to the lower end of one of the left and right side walls of the trough portion 65*g* (the side wall on the opposite side of the side plate portion 65*c*), faces the side plate portion 65*c*, and is nearly parallel with the upper plate portion 65*a* and the lower plate portion 65*b*. The area from the tip of the first contacting tip portion 65 to the middle plate portion 65*f* in the cavity demarcated on three sides by the upper plate portion 65*a*, the lower plate portion 65*d*, and the side plate portion 65*c* is the tip mating recessed portion 65*d* that the contacting tip entrance portion 14*e* that is the recessed entrance portion of the first housing 11 enters into from the front.

Since the rear end of the side plate portion 65*c* is connected to the other of the left and right side walls of the trough portion 65*g* and the tip mating recessed portion 65*d* has a U-shaped cross section, the first contacting tip portion 65 has a large moment of inertia of area, high rigidity, and does not readily deform. Moreover, since the lower surface of the middle plate portion 65*f* is in contact with or close to the upper surface of the lower plate portion 65*b* near the back end to support the lower plate portion 65*b* from above, this reinforces the lower plate portion 65*d*, which does not readily deform upwards.

The first housing 11 has a main body portion 12 extending in the width direction of the first connector 1 and a mating protruding portion 14 extending forward from the main body portion 12. Furthermore, the rear surface 11*r* of the first housing 11 is open and there are a plurality of terminal stowing holes 13 that pass through the main body portion 12 and the mating protruding portion 14 extending in the front-to-back direction from the rear surface 11*r* to the mating protruding portion 14. The terminal stowing hole 13 is a space for stowing the first terminal 61 connected to the end of one electrical wire 91 and the portion of the electrical wire 91 near the first terminal 61, respectively, and the terminal stowing holes 13 have the same arrangement and number as the electrical wires 91. Therefore, in the example illustrated in the drawings, ten terminal stowing holes 13 are formed in a row in the width direction of the first connector 1. A dummy opening 13*d* is formed on the rear surface 11*r* of the first housing 11 on the outside of the row of terminal stowing holes 13.

The mating protruding portion 14 includes a flat plate shaped horizontal partition plate 14*c* that extends in the width direction of the first connector 1 and a plurality of vertical partition plates 14*d* that extend upward and downward from a plurality of locations on both upper and lower surfaces of the horizontal partition plate 14*c*. The vicinity of the tip of the mating protruding portion 14 in each terminal stowing hole 13 is divided into an upper portion 13*a* and a lower portion 13*b* by the horizontal partition plate 14*c*. In addition, both left and right sides of each terminal stowing hole 13 are demarcated by the vertical partition plates 14*d*.

Furthermore, a mating top plate 14*a* is connected as a top plate to the upper part of the vertical partition plates 14*d* that extend upwards. The mating top plate 14*a* extends forward from the main body portion 12 on an upper surface 11*a* side of the first housing 11, is present over nearly the entire area in the front-to-back direction of the mating protruding portion 14, is a member demarcated by the upper surface of the upper portion 13*a* of the terminal stowing hole 13, has an upper slit 16*a* extending in the front-to-back direction formed in a position corresponding to each upper portion 13*a*, and is split into a plurality of members in the width direction of the first connector 1 by the upper slits 16*a*. The divided individual mating top plates 14*a* have a strip-shaped form extending from the vicinity of the base end to the tip end of the mating protruding portion 14. Furthermore, when the first connector 1 and the second connector 101 are mated, a contact upper arm portion 164 of the second terminal 161 of the second connector 101 passes through the upper slit 16*a* and enters the upper portion 13*a* of the terminal stowing hole 13.

In addition, a mating bottom plate 14*b* as a bottom plate portion is connected to the lower end of the vertical partition plate 14*d* extending downward. The mating bottom plate 14*b* is a member that extends rearward by a prescribed length from the tip of the mating protruding portion 14 and demarcates the lower surface of the lower portion 13*b* of the terminal stowing hole 13. A lower slit 16*b* is formed extending in the front-to-back direction at a position corresponding to each lower portion 13*b* and the mating bottom plate 14*b* is split into a plurality of members in the width direction of the first connector 1 by this lower slit 16*b*. Furthermore, when the first connector 1 and the second connector 101 are mated, a contact lower arm portion 163 of the second terminal 161 of the second connector 101 passes through the lower slit 16*b* and enters the lower portion 13*b* of the terminal stowing hole 13.

Furthermore, a contacting tip entrance portion 14*e* that is formed thick extends in the front-to-back direction from the tip of the horizontal partition plate 14*c* to the rear a prescribed distance. In addition, a center slit 14*s* is formed on the side wall of one of either the left or right horizontal partition plates 14*c* (negative Y-axis side in the example illustrated in the drawings) extending in the front-to-back direction along the vertical partition plate 14*d*. The center slit 14*s* can enter into the side plate portion 65*c* in the first contacting tip portion 65 of the first terminal 61 and extends from the base end to the tip of the horizontal partition plate 14*c*.

Furthermore, the first housing 11 includes a housing lance 15 on a lower surface 11*b* thereof as a protruding piece that extends from the main body portion 12 towards the front. The housing lances 15 are arranged in a row in the width direction of the first connector 1, and each is positioned below the terminal stowing hole 13 in the mating protruding portion 14. Each of the housing lances 15 have a narrow strip shape extending from the main body portion 12 and they are mutually separated by lance slits 15*d* that extend in the front-to-back direction and are formed between adjacent lances. In addition, each of the housing lances 15 is a cantilever member and includes a base end portion 15*a* connected to the main body portion 12, an inclined arm portion 15*b* that extends diagonally upward from this base end portion 15*a*, and a contacting portion 15*c* that is the free end (tip) of this inclined arm portion 15*b* and that contacts the rear end of the terminal lance 65*e*. The width of the corresponding contacting portion 15*c* is substantially the same as the width of the terminal lance 65*e*.

The first terminal 61 connected to the end of each electrical wire 91 is inserted and attached into the corresponding terminal stowing hole 13 from the rear surface 11*r* side of the first housing 11. As illustrated in FIG. 4, upon completion of the attachment of the first terminal 61, the first contacting tip portion 65 reaches near the tips of the mating protruding portion 14, the side plate portion 65*c* of the first contacting tip portion 65 enters into the center slit 14*s* formed in the horizontal partition plate 14*c*, the upper plate portion 65*a* of the first contacting tip portion 65 is positioned below the mating top plate 14*a* in the upper portion 13*a* of the terminal stowing hole 13, the lower plate portion 65*b* of the first contacting tip portion 65 is positioned above the mating bottom plate 14*b* in the lower portion 13*b* of the terminal stowing hole 13, and the contacting tip entrance portion 14*e* enters into and is stowed in the tip mating recessed portion 65*d* of the first contacting tip portion 65. Thus, the first contacting tip portion 65 is reinforced where in particular, a force applied in the vertical direction does not cause deformation reducing the spacing between the upper plate portion 65*a* and lower plate portion 65*b*. In addition, the width of the terminal lance 65*e* of the first contacting tip portion 65 is the same as the width of the lower plate portion 65*d*, and is positioned in front of the contact portion 15*c* of the housing lance 15. The rear end of the terminal lance 65*e* faces the contacting portion 15*c* of the housing lance 15 and is close to or in contact with the contacting portion 15*c*. Therefore, when the attachment of the first terminal 61 is complete, the terminal lance 65*e* is engaged to the housing lance 15, so that the first terminal 61 cannot move backward even if a pull force acts on the electrical wires 91 and reliably prevents pulling out from inside the terminal stowing hole 13.

The second connector 101 is integrally formed of an insulating material such as synthetic resin and includes a second housing 111 as a mating housing having an overall flat rectangular body shape, second terminals 161 as mating terminals made of metal attached to the second housing 111, and an auxiliary metal fitting 181 as a female base plate housing attachment auxiliary metal fitting attached to the second housing 111. The number and arrangement of the second terminals 161 can be arbitrarily set, but here, for convenience of explanation, the same number and arrangement as that of the first terminals 61 is assumed.

The second terminals 161 in the present embodiment are members integrally formed by punching a metal plate, and have an overall U-shape or a U-shaped side surface shape. Furthermore, the second terminal 161 includes a securing portion 165 as a main body portion, a tail portion 162 as a base plate connecting portion extending downward from the lower end of the securing portion 165, the contact upper arm portion 164 and contact lower arm portion 163 as mating contact portions extending from the securing portion 165 toward the front. Furthermore, an engaging protrusion 165*a* that engages with a second terminal holding portion 116*a* of the second housing 111 is formed in the securing portion 165. An upper contacting protrusion 164*a* in contact with the upper plate portion 65*a* of the first contacting tip portion 65 of the first terminal 61 is formed in the vicinity of the free end (tip) of the contact upper arm portion 164. A lower contacting protrusion 163*a* in contact with the lower plate portion 65*b* of the first contacting tip portion 65 of the first terminal 61 is formed in the vicinity of the free end (tip) of the contact lower arm portion 163.

In addition, the auxiliary metal fitting 181 is a member integrally formed through bending and punching a member and includes a flat shaped main body portion 183, a tail portion 182 that is bent approximately 90 degrees and is connected to the lower end of the main body portion 183 and extends towards the outside of the second connector 101 in the width direction as a base plate connecting part, a securing portion 184 that extends from the rear end of the main body portion 183 rearward (positive direction of X-axis), and a shoulder retaining portion 185 that is bent approximately 90 degrees and connected to the upper end of the main body portion 183 and extends towards the inside of the second connector 101 in the width direction. The auxiliary metal fitting 181 is an auxiliary member for stably securing the second connector 101 to the base plate 191 and is secured to the second housing 111. The tail portion 182 is connected to the surface of a connecting pad 192 formed on the surface of the board 191 using a connecting means such as soldering.

The second housing 111 includes a main body portion 112 extending in the width direction of the second connector 101 and a forward protruding portion 114 that extends from the main body portion 112 in the forward direction (negative direction of X-axis). Furthermore, a mating recessed part 113 is formed in the second housing 111 with a front surface 111*f* that is open and that extends in the front-to-back direction through the forward protruding portion 114 and main body portion 112 to a rear surface 111*r* of the second housing 111. When the first connector 1 and second connector 101 are mated, the mating protruding portion 14 of the first housing 11 is inserted into the mating recessed part 113 for meshing. In addition, a plurality of terminal insertion openings 116 that communicate with the mating recessed parts 113 are formed on the rear surface 111*r* of the second housing 111. The terminal insertion opening 116 is an opening into which one second terminal 161 is inserted, and is formed in the same arrangement as the second terminals 161 and in the same number as the second terminals 161. Therefore, in the example illustrated in the drawings, ten terminal insertion openings 116 are formed in a row in the width direction of the second connector 101. Second terminal holding portions 116*a* are provided in each terminal insertion opening 116.

Further, a plurality of upper terminal stowing grooves 115*a* are formed on the ceiling surface of the mating recessed part 113, in other words, on the inner surface of the upper surface 111*a* side of the second housing 111 extending in the front-to-back direction (X-axis direction). A plurality of lower terminal stowing grooves 115*b* are formed on the bottom surface inside the mating recessed part 113, in other words, on the inner surface of the lower surface 111*b* side of the second housing 111 extending in the front-to-back direction. Note, guide protruding portions 115*c* that protrude downward (Z-axis negative direction) are formed at the portion of the ceiling surface inside the mating recessed part 113 near the front surface 111*f* of the second housing 111 at a location corresponding to each upper terminal stowing groove 115*a*.

Furthermore, the main body portion 112 protrudes outward in the width direction of the second connector 101 beyond the forward protruding portion 114, and an auxiliary metal fitting securing hole 112*d* extending in the front-to-back direction is formed in a protruding portion 112*f* thereof. In addition, a bulge outward portion 114*c* is formed on the forward protruding portion 114 at the outer end of the second connector 101 in the width direction and the upper end of the bulge outward portion 114*c* is a shoulder part 114*a*.

Each second terminal 161 is inserted into and attached to the corresponding terminal insertion opening 116 from the rear surface 111*r* side of the second housing 111. As illustrated in FIG. 8, upon completion of attaching the second terminals 161, the contact lower arm portions 163 are stowed in the corresponding lower terminal stowing grooves 115*b* but the contact upper arm portions 164 are positioned just below the upper terminal stowing grooves 115*a* rather than inside the upper terminal stowing grooves 115*a*. In addition, the engaging protrusion 165*a* of the securing portion 165 engages with the second terminal holding portion 116*a* in the terminal insertion opening 116 so the second terminal 161 is secured to the second housing 111.

In addition, for each auxiliary metal fitting 181, the shoulder retaining portion 185 engages with the shoulder part 114*a* in the bulge outward portion 114*c* of the second housing 111 and the securing portion 184 is inserted into and secured to the auxiliary metal fitting securing hole 112*d* of the second housing 111 and thereby attached to the second housing 111.

In this manner, the second connector 101 with the second terminals 161 and auxiliary metal fittings 181 attached to the second housing 111 is mounted on the surface of the board 191 as illustrated in FIG. 1. Specifically, the tail portion 162 of each second terminal 161 is electrically and mechanically connected to each of the connector electrodes (not shown) formed on the surface of the board 191 by connecting means such as soldering. Each of the connector electrodes is connected to a conductive trace (not shown) provided on the board 191 that functions as a signal line. In addition, the tail portion 182 of the auxiliary metal fitting 181 is mechanically connected to the surface of the connecting pad 192 formed on the surface of the board 191 by connection means such as soldering.

Subsequently, the operation of mating together the first connector 1 and the second connector 101 with the above configuration will be described.

Figure 9:
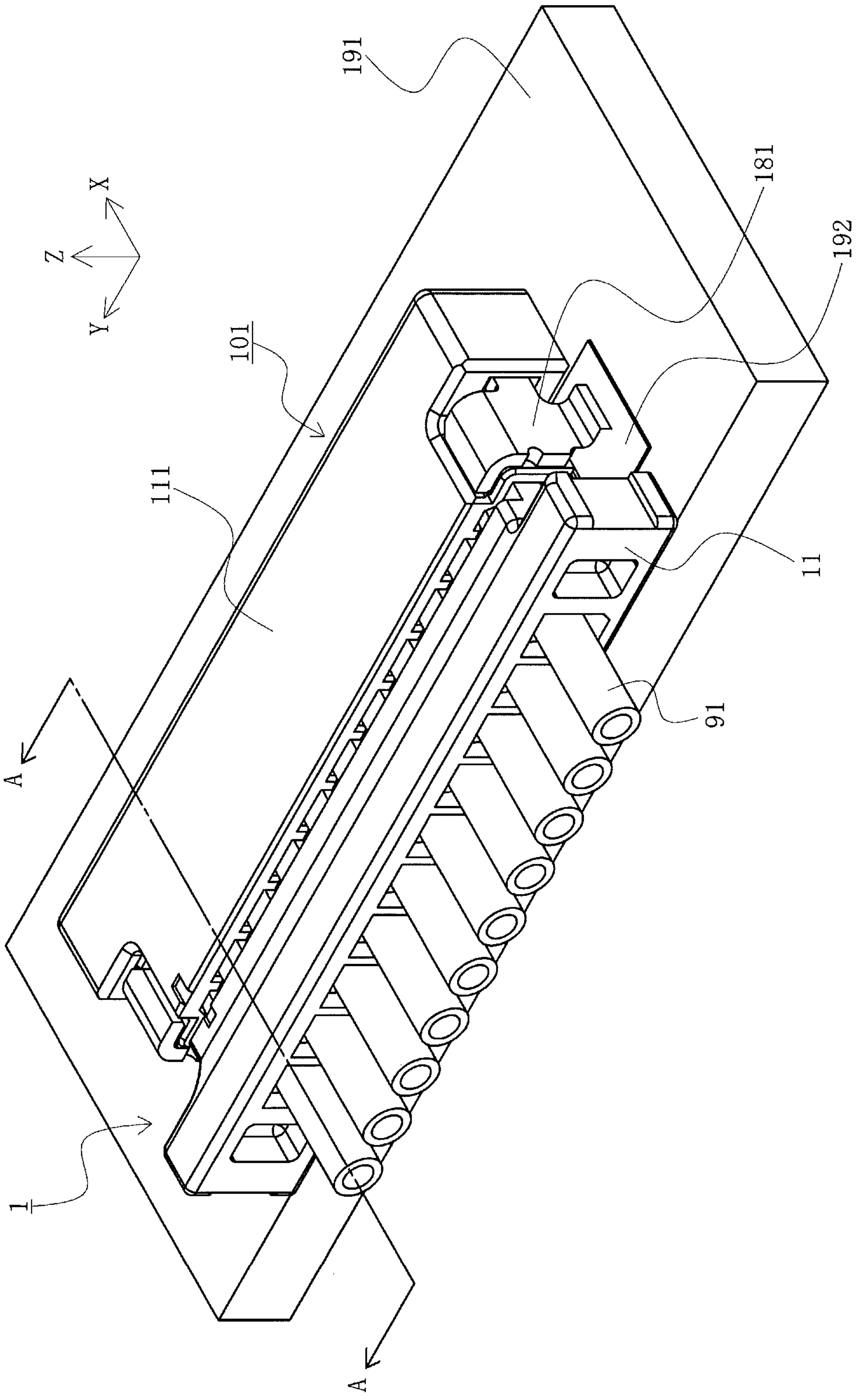
FIG. 9 is a perspective view illustrating the first connector and the second connector of the present embodiment in a meshed state.
Figure 10:
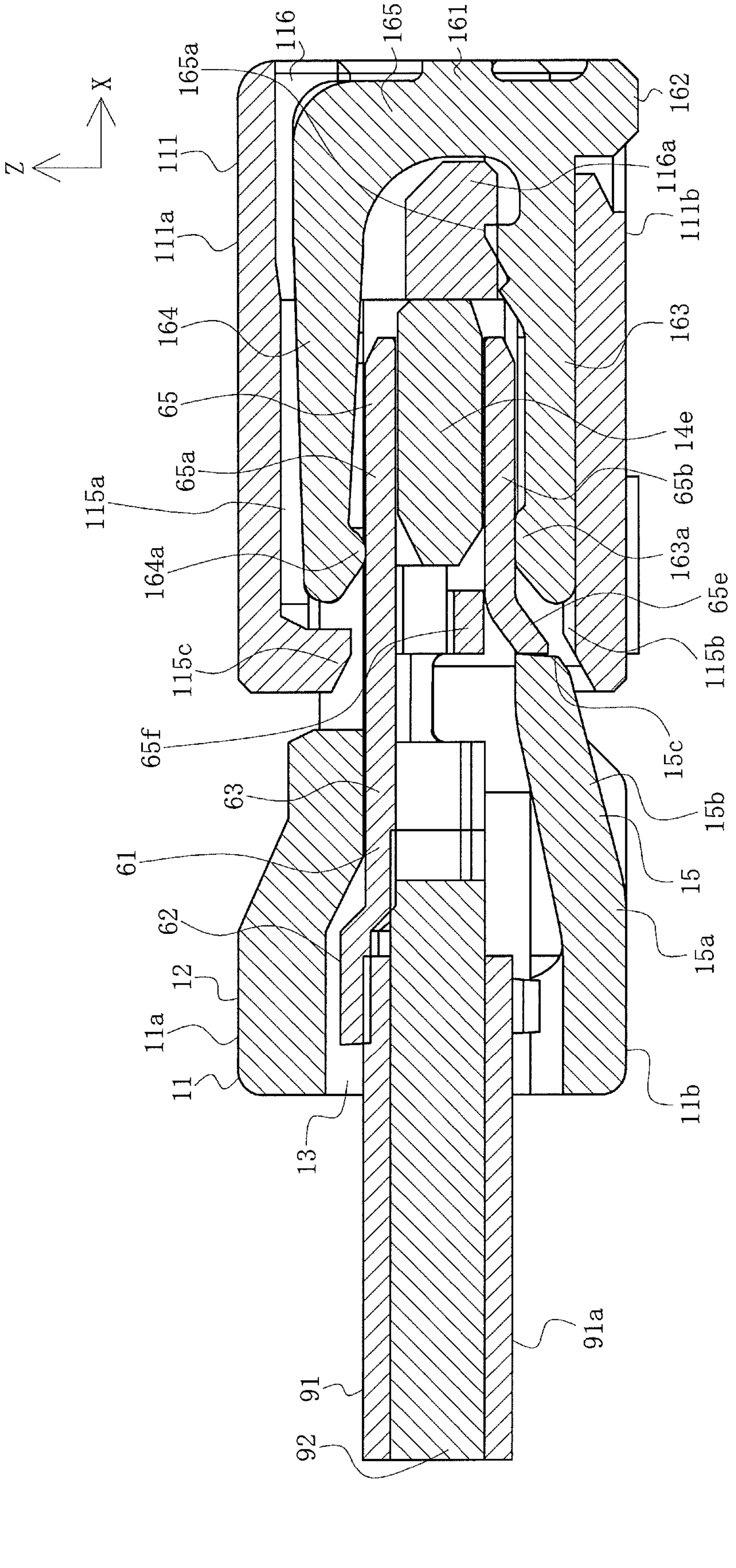
FIG. 10 is a side cross-sectional view of the first connector and the second connector in a meshed state according to the present embodiment and is a cross-section taken along line A-A in FIG. 9.
Figure 11A:
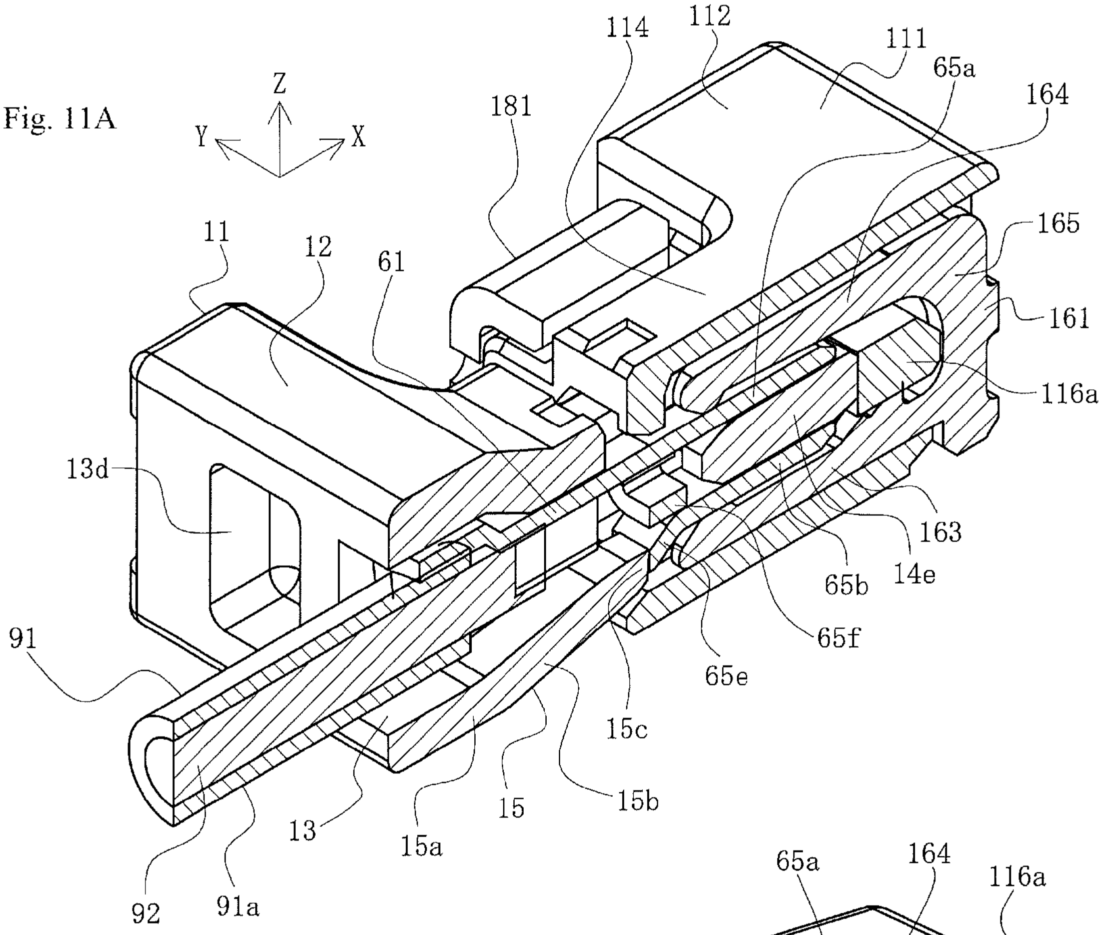
FIG. 11A and FIG. 11*b* are views from different angles.
Figure 11B:
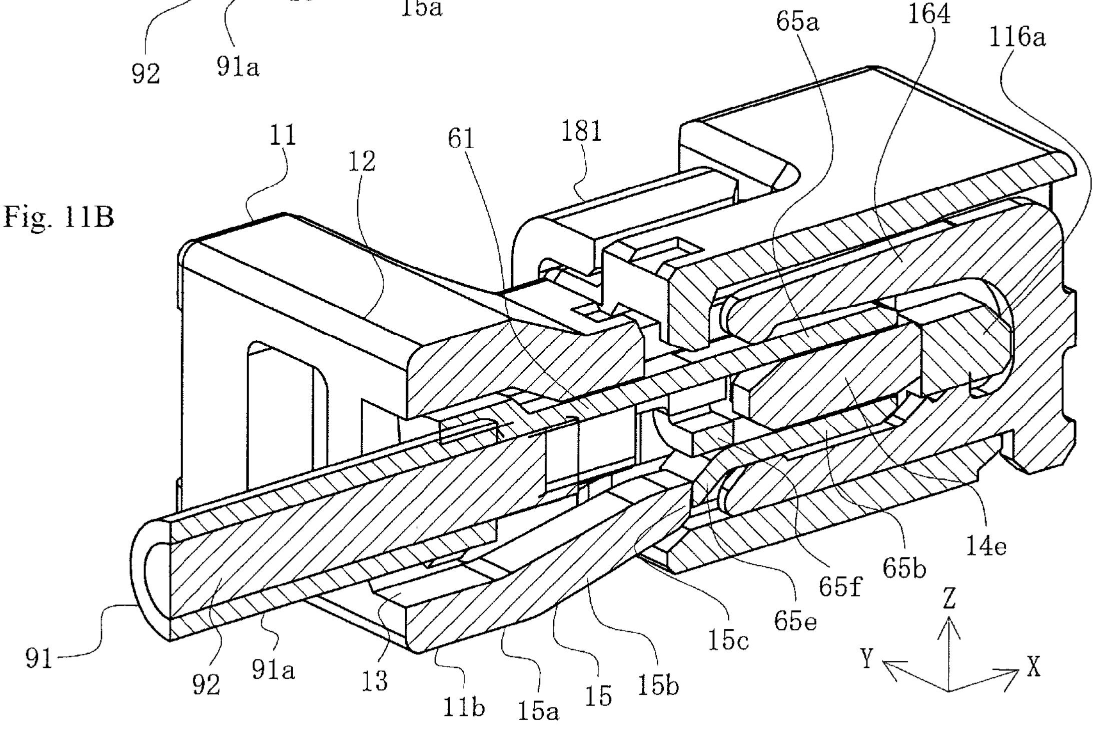
Figure 12:
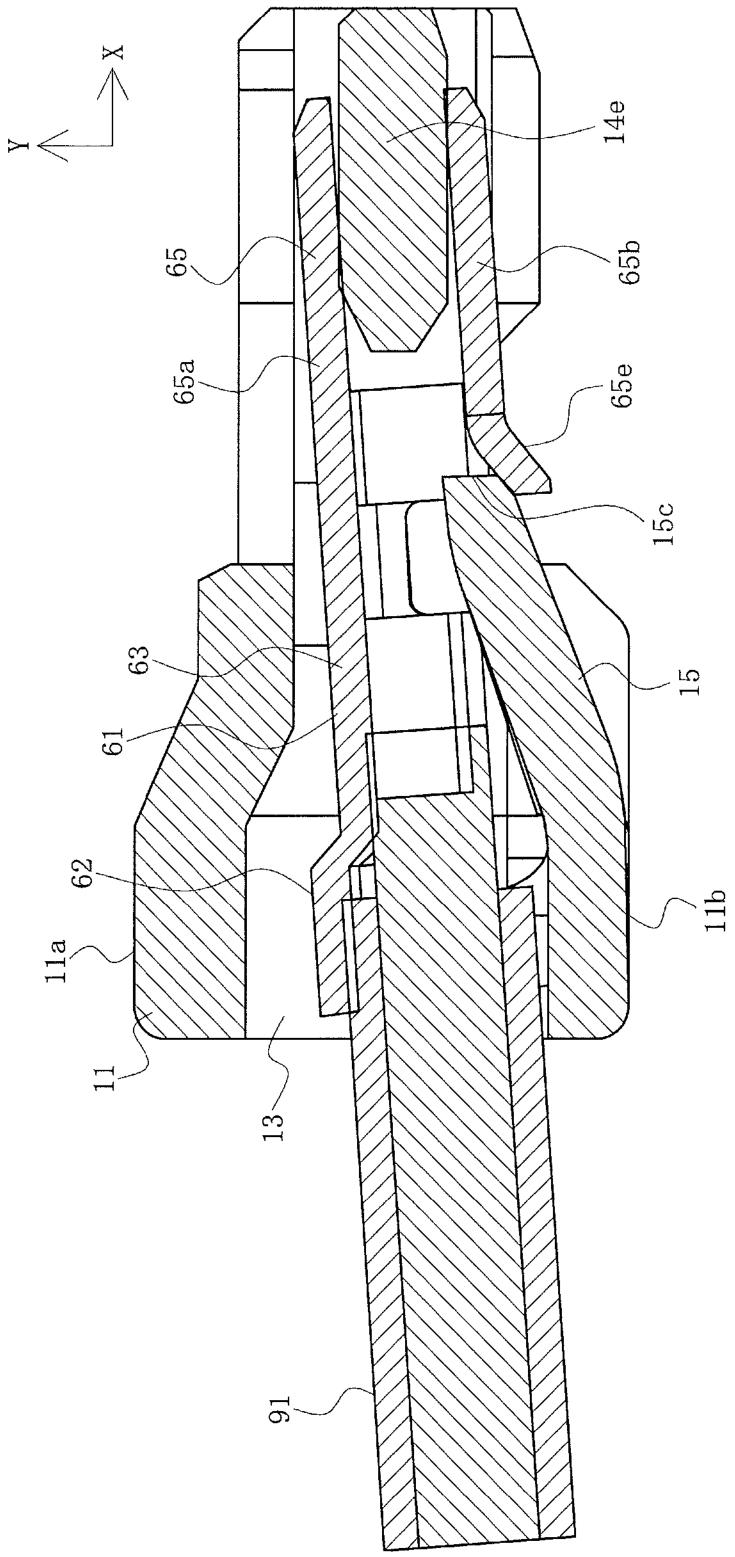
FIG. 12 is a side cross-sectional view of the first connector of a comparative example.
Figure 13:
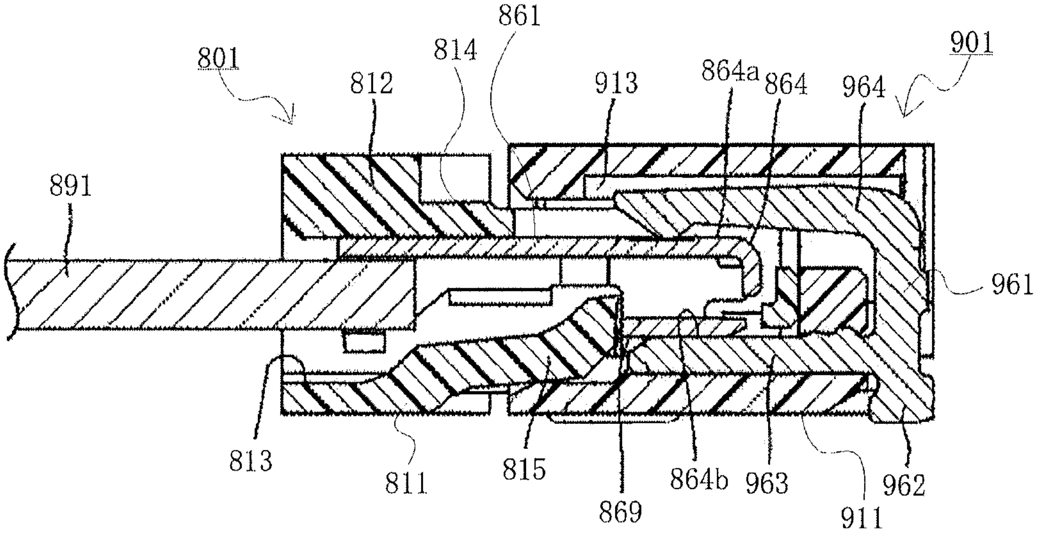
Prior art Fig. 13
FIG. 13 is a cross-sectional view illustrating a conventional electrical wire connector and a board connector in a meshed state.

FIG. 9 is a perspective view illustrating the first connector and the second connector of the present embodiment in a meshed state. FIG. 10 is a side cross-sectional view of the first connector and the second connector in a meshed state according to the present embodiment and is a cross-section taken along A-A in FIG. 9. FIG. 11 is a side cross-sectional view of the first connector and the second connector in a meshed state according to the present embodiment and is a perspective view of a cross-section along A-A in FIG. 9. FIG. 12 is a side cross-sectional view of the first connector in the comparative example. Note, in FIG. 11, (a) and (b) are views in which the viewing angles are different from each other.

Here, through connecting the first terminals 61 to the end of the electrical wires 91, the first connector 1 is assumed to be connected to the end of the cable provided with the electrical wires 91. In addition, the tail portions 162 of the second terminals 161 are connected to electrodes formed on the surface of the board 191 for connecting by soldering or the like and the tail portions 182 of the auxiliary metal fittings 181 are connected to connecting pads 192 formed on the surface of the board 191 by soldering or the like and thus the second connector 101 is mounted on the surface of the board 191.

First, as illustrated in FIG. 1, the operator sets the mating protruding portion 14 of the first connector 1 facing the mating recessed part 113 of the second connector 101. Next, the operator moves the first connector 1 and/or second connector 101 closer to the mating side, inserts the mating protruding portion 14 of the first connector 1 into the mating recessed part 113 of the second connector 101 and as illustrated in FIG. 9, meshes the first connector 1 and the second connector 101.

Here, the contact upper arm portions 164 of the second terminals 161 corresponding to the second connector 101 enter into each of the upper slits 16*a* formed on the mating top plate 14*a* of the mating protruding portion 14 and the contact lower arm portions 163 of the second terminals 161 corresponding to the second connector 101 enter into each of the lower slits 16*b* formed on the mating bottom plate 14*b* of the mating protruding portion 14.

Furthermore, as illustrated in FIG. 10 and FIG. 11, the upper contacting protrusion 164*a* of the contact upper arm portion 164 of the second terminal 161 comes into contact and conducts with the upper surface of the upper plate portion 65*a* of the first contacting tip portion 65 of the first terminal 61 positioned below the upper slit 16*a*. The lower contacting protrusion 163*a* of the contact lower arm portion 163 of the second terminal 161 comes into contact and conducts with the lower surface of the lower plate portion 65*b* of the first contacting tip portion 65 of the first terminal 61 positioned above the lower slit 16*b*. In this manner, the first contacting tip portion 65 of the first terminal 61 is inserted between the upper contacting protrusion 164*a* of the contact upper arm portion 164 and the lower contacting protrusion 163*a* of the contact lower arm portion 163 of the second terminal 161 so primarily, the cantilever shaped contact upper arm portion 164 is elastically displaced upward, and the space between the upper contacting protrusion 164*a* and the lower contacting protrusion 163*a* is elastically widened. Furthermore, the upper plate portion 65*a* and lower plate portion 65*b* of the first contacting tip portion 65 are held between the upper contacting protrusion 164*a* and lower contacting protrusion 163*a* from above and below. As illustrated in FIG. 10 and FIG. 11, upon completion of the mating of the first connector 1 and the second connector 101, the tip of the mating protruding portion 14 inserted into the mating recessed part 113 contacts the second terminal holding portion 116*a* so further movement of the mating protruding portion 14 deeper into the mating recessed part 113 (X-axis positive direction) is prevented.

In this manner, the upper contacting protrusion 164*a* of the contact upper arm portion 164 and the lower contacting protrusion 163*a* of the contact lower arm portion 163 of the second terminal 161 come into contact and conduct with the upper plate portion 65*a* and lower plate portion 65*b* of the first contacting tip portion 65 of the first terminal 61 so the first terminal 61 conducts with the second terminal 161 and as a result, the electrical wire 91 connected to the first terminal 61 conducts with the conductive trace connected to the board 191 connector electrode that the tail portion 162 of the second terminal 161 is connected to.

In addition, as illustrated in FIG. 10 and FIG. 11, the contacting tip entrance portion 14*e* enters into and is stowed inside the tip mating recessed portion 65*d* of the first contacting tip portion 65 of the first terminal 61. Therefore, the tip mating recessed portion 65*d* is not a closed space with a square shaped cross section demarcated on four sides but rather is demarcated on three sides by the upper plate portion 65*a*, the lower plate portion 65*d*, and the side plate portion 65*c*. Even with a space with a U shaped cross section that is open on one side, deformation due to an external force will not occur because the contacting tip entrance portion 14*e* that is a part of the mating protruding portion 14 of the first housing 11 is stowed therein. Therefore, even if the upper plate portion 65*a* and the lower plate portion 65*b* are sandwiched between the upper contacting protrusion 164*a* and the lower contacting protrusion 163*a* of the second terminal 161 from above and below, the first contacting tip portion 65 including the tip mating recessed portion 65*d* will not deform.

Furthermore, in the vicinity of the rear end in the tip mating recessed portion 65*d*, there is a middle plate portion 65*f* extending substantially parallel with the upper plate portion 65*a* and the lower surface thereof is in contact with or in the vicinity of the upper surface near the rear end of the lower plate portion 65*b* supporting the lower plate portion 65*b* from above and thus the lower plate portion 65*b* does not readily deform upwards.

Furthermore, the terminal lance 65*e* of the first contacting tip portion 65 is positioned in front of the contacting portion 15*c* of the housing lance 15 and the rear end of the terminal lance 65*e* faces the contacting portion 15*c* of the housing lance 15 and comes into contact and engages with the contacting portion 15*c*. Therefore, even if the electrical wire 91 is pulled or the electrical wire 91 is agitated and a force pulling backward (in the negative direction of the X-axis) acts on the first terminal 61, the first terminal 61 attached to the first housing 11 will not pull out backward.

Furthermore, the lower plate portion 65*b* is formed with the rear end portion standing up and the contacting portion 15*c* that is the tip end of the housing lance 15 inclined arm portion 15*b* that extends from the first housing 11 main body portion 12 upwards toward the front contacts the rear end of the terminal lance 65*e* that extends diagonally downward from the rear end of the lower plate portion 65*b* so the housing lance 15 inclined arm portion 15*b* contacts and engages with the terminal lance 65*e* in nearly a straight line and the width of the contacting portion 15*c* is substantially the same as the width of the terminal lance 65*e* so engagement of the terminal lance 65*e* is not readily disengaged from the housing lance 15.

Furthermore, the terminal lance 65*e* is a portion formed with the rear end portion of the lower plate portion 65*b* standing up, the width thereof is the same as the lower plate portion 65*d*, and being integrated with the lower plate portion 65*d*, has high strength. Moreover, since the rear end of the lower plate portion 65*b* is supported from above by the middle plate portion 65*f*, the terminal lance 65*e* is not readily deformed upward, similar to the rear end of the lower plate portion 65*b*. Therefore, the contacting portion 15*c* of the housing lance 15 is displaced relatively downward with the upward displacement of the terminal lance 65*e* and therefore will not move along the lower surface of the terminal lance 65*e* relative to the tip end of the first contacting tip portion 65.

Furthermore, since the middle plate portion 65*f* is present above the terminal lance 65*e*, the contacting portion 15*c* of the housing lance 15 is displaced relatively upwardly, and therefore will not enter into the tip mating recessed portion 65*d* along the upper surface of the terminal lance 65*e*. For example, as in the comparative example illustrated in FIG. 12, when the middle plate portion 65*f* is omitted and a force acts on the electrical wire 91 pulling diagonally downward, the first contacting tip portion 65 is inclined relative to the first housing 11 so the contacting portion 15*c* of the housing lance 15 is displaced relatively upward causing the possibility of entering into the tip mating recessed portion 65*d* along the upper surface of the terminal lance 65*e*. However, with the present embodiment, the middle plate portion 65*f* above the terminal lance 65*e* reliably prevents the housing lance 15 contacting portion 15*c* from entering the tip mating recessed portion 65*d*.

In this manner, since the terminal lance 65*e* engagement is securely maintained by the housing lance 15, even with a pull force acting on the first terminal 61, the first terminal 61 being pulled out from inside the terminal stowing hole 13 is reliably prevented. In addition, since the contacting portion 15*c* of the housing lance 15 does not move relatively toward the tip end side of the first contacting tip portion 65 along the upper surface or the lower surface of the terminal lance 65*e*, no load is applied to the housing lance 15 and so the housing lance 15 is not injured or damaged.

As described above, with the present embodiment, the first terminal 61 is integrally formed from a conductive metal plate and is connected to the end of the electrical wire 91. Furthermore, the first terminal 61 includes the conducting wire connecting portion 63 connected to the core wire 92 of the electrical wire 91 and the first contacting tip portion 65 that is connected to the front end of the conducting wire connecting portion 63 having a U shaped cross-section that contacts the second terminal 161. The first contact tip portion 65 includes an upper plate portion 65*a* connected to the conducting wire connecting portion 63, a lower plate portion 65*b* parallel to the upper plate portion 65*a*, and a side plate portion 65*c* connecting one of either the left or right edges of the upper plate portion 65*a* and lower plate portion 65*d*, the tip mating recessed portion 65*d* demarcated on three sides by the upper plate portion 65*a*, the lower plate portion 65*d*, and the side plate portion 65*c*, the terminal lance 65*e* that extends from the rear end of the lower plate portion 65*b* diagonally downward, and the middle plate portion 65*f* that extends between the terminal lance 65*e* and the upper plate portion 65*a* in the width direction of the first contacting tip portion 65.

In addition, the first connector 1 includes the first terminal 61, insulating material, and the first housing 11 the first terminal 61 is attached to. Furthermore, the first housing 11 includes the main body portion 12, the mating protruding portion 14 that extends from the main body portion 12, the terminal stowing hole 13 that extends through the main body portion 12 and the mating protruding portion 14 into which the first terminal 61 is inserted, and the housing lance 15 that extends from the main body portion 12. The mating protruding portion 14 includes the contacting tip entrance portion 14*e* that is stowed in the tip mating recessed portion 65*d* of the first contacting tip portion 65 of the first terminal 61 that is inserted into the terminal stowing hole 13. The housing lance 15 includes the base end portion 15*a* connected to the main body portion 12, the inclined arm portion 15*b* that extends from the base end portion 15*a* diagonally upwards, and the contacting portion 15*c* at the tip of the inclined arm portion 15*b* that enables contact with the rear end of the terminal lance 65*e* of the first terminal 61 that is inserted into the terminal stowing hole 13.

Furthermore, the wire-to-board connector includes the first connector 1 and a second connector 101 that mates with the first connector 1 provided with a second housing 111 composed of an insulating material and a second terminal 161 integrally formed from a conductive metal plate that contacts with the first terminal 61 of the first connector 1 and is mounted in the second housing 111, the second connector 101 being mounted on the surface of the board 191. Furthermore, the second housing 111 includes a mating recessed part 113 into which the mating protruding portion 14 of the first housing 11 of the first connector 1 is inserted. The second terminal 161 includes a securing portion 165 for securing to the second housing 111 and a mating contact portion that extends from the securing portion 165 and contacts the first contacting tip portion 65 of the first terminal 61 of the first connector 1. The mating contact portion includes the contact upper arm portion 164 that contacts the upper surface of the upper plate portion 65*a* of the first contacting tip portion 65 and the contact lower arm portion 163 that contacts the lower surface of the lower plate portion 65*b* of the first contacting tip portion 65 and sandwiches the upper plate portion 65*a* and lower plate portion 65*b*.

As a result, even if the first terminal 61 and the first housing 11 are miniaturized, disengagement of the terminal lance 65*e* of the first terminal 61 and the housing lance 15 of the first housing 11 can be prevented and pulling out of the first terminal 61 can be reliably prevented. Damage to the first terminal 61 and the first housing 11 can be reliably prevented. The first terminal 61 can be reliably secured to the first housing 11. Thus, providing a first terminal 61, first connector 1, and wire-to-board connector with a low profile and size reduction of the first connector 1 and second connector 101, simplified configuration, low part count, simplified manufacturing, low cost, and high reliability is feasible.

Note that the disclosure herein describes features relating to suitable exemplary embodiments. Various other embodiments, modifications, and variations within the scope and spirit of the claims appended hereto will naturally be conceived of by those skilled in the art upon review of the disclosure herein.

The present disclosure can be applied to electrical wire connectors and wire-to-board connectors.

The invention claimed is:

1. A terminal connected to an end of an electrical wire, comprising:

a main body portion configured to be connected to a core wire of the electrical wire, the main body portion having a front end and a back end; and a contacting portion extending from the front end of the main body portion, the contacting portion including an upper plate portion extending from the main body portion, the upper plate portion having a back end, a front end, and first and second side edges extending therebetween, a lower plate portion that is parallel with the upper plate portion, the lower plate portion having a back end, a front end, and first and second side edges extending therebetween, a side plate portion extending between the first side edges of the upper plate portion and the lower plate portion, the upper plate portion, the lower plate portion and the side plate portion defining a U-shaped cross-section and configured to be connected to a mating terminal, a tip mating recessed portion demarcated on three sides by the upper plate portion, the lower plate portion, and the side plate portion, an inclined protruding piece extending diagonally downward from the back end of the lower plate portion, the inclined protruding piece having a back end, a front end, and first and second side edges extending therebetween, and wherein a width of the contacting portion is defined between the first and second side edges of the upper plate portion, a middle plate portion extending in a width direction of the contacting portion and extending from the main body portion, the middle plate portion being positioned under the inclined protruding piece and above the upper plate portion, wherein the main body portion and the contacting portion are integrally formed from a conductive metal plate.

2. The terminal according to claim 1, wherein an upper surface of the upper plate portion and a lower surface of the lower plate portion contact with a mating contact portion of the mating terminal when the terminal and the mating terminal are coupled together.

3. The terminal according to claim 1, wherein a width of the inclined protruding piece is the same as a width of the lower plate portion.

4. The terminal according to claim 1, wherein the contacting portion further comprises a base part having a base wall, and first and second side walls extending therefrom which define a U-shaped cross-section, the base part extending from the front end of the main body portion, wherein the upper plate portion extends from the base wall, and wherein the middle plate portion extends from a lower end of the second side wall of the base part and extends towards the side plate portion, and wherein a bottom surface of the middle plate portion comes into contact with or is in contact with an upper surface of the back end of the lower plate portion.

5. An electrical wire connector comprising:

the terminal according to claim 1 and further comprising:

an insulative housing including a main body portion, a mating protruding portion extending from the main body portion of the insulative housing, a terminal stowing hole extending through the main body portion of the insulative housing and the mating protruding portion, wherein the terminal is inserted into the terminal stowing hole, the mating protruding portion includes a recessed entrance portion which receives the tip mating recessed portion of the terminal inserted in the terminal stowing hole, and a housing lance extending from the main body portion of the insulative housing, the housing lance including a base end portion connected to the main body portion of the insulative housing, an inclined arm portion extending diagonally upward from the base end portion, and a contacting portion at a tip of the inclined arm portion that contacts with a rear end of the inclined protruding piece of the terminal inserted into the terminal stowing hole.

6. The electrical wire connector according to claim 5, wherein a width of the contacting portion of the housing lance is substantially the same as a width of the inclined protruding piece of the terminal.

7. A wire-to-board connector comprising:

the electric wire connector according to claim 5, and further comprising a board connector configured to be mounted to a surface of a board, wherein the board connector includes an insulative mating housing, the mating housing includes a mating recessed portion into which the mating protruding portion of the electrical wire connector housing is inserted, a mating terminal integrally formed from a conductive metal plate that contacts the terminal of the electrical wire connector and is mounted in the mating housing, the mating terminal includes a securing portion configured to secure the mating housing and a mating contact portion that extends from this the securing portion and contacts the contacting portion of the terminal, and the mating contact portion includes a contact upper arm portion that contacts the upper surface of the upper plate portion of the contacting portion, and a contact lower arm portion that contacts the lower surface of the lower plate portion of the contacting portion, and holds the upper plate portion and the lower plate portion.

8. The terminal according to claim 1, wherein a bottom surface of the middle plate portion comes into contact with or is in contact with an upper surface of the back end of the lower plate portion.

* * * * *